(12) United States Patent
Bader

(10) Patent No.: US 7,963,338 B1
(45) Date of Patent: Jun. 21, 2011

(54) METHODS TO TREAT PRODUCED WATER

(76) Inventor: Mansour S. Bader, College Station, TX (US)

(*) Notice: Subject to any disclaimer, the term of this patent is extended or adjusted under 35 U.S.C. 154(b) by 323 days.

(21) Appl. No.: 12/380,513

(22) Filed: Feb. 27, 2009

(51) Int. Cl.
*E21B 43/22* (2006.01)
*B01D 61/36* (2006.01)
*B01D 61/02* (2006.01)
*B01D 61/00* (2006.01)
*E21B 43/00* (2006.01)

(52) U.S. Cl. ........ 166/371; 166/279; 166/300; 166/309; 166/310; 210/650; 210/652; 210/640; 210/767

(58) Field of Classification Search .................. None
See application file for complete search history.

(56) References Cited

U.S. PATENT DOCUMENTS

| | | | | |
|---|---|---|---|---|
| 4,327,146 A * | 4/1982 | White | ............... | 428/308.8 |
| 4,347,704 A * | 9/1982 | Marquardt et al. | ............ | 60/648 |
| 5,468,394 A | 11/1995 | Bader | | |
| 5,587,088 A * | 12/1996 | Bader | ............... | 210/729 |
| 6,365,051 B1 | 4/2002 | Bader | | |
| 6,372,143 B1 * | 4/2002 | Bradley | ............... | 210/638 |
| 6,663,778 B1 * | 12/2003 | Bader | ............... | 210/640 |
| 7,093,663 B1 * | 8/2006 | Bader | ............... | 166/371 |
| 7,392,848 B1 | 7/2008 | Bader | | |
| 7,501,065 B1 * | 3/2009 | Bader | ............... | 210/652 |
| 7,789,159 B1 * | 9/2010 | Bader | ............... | 210/640 |

* cited by examiner

*Primary Examiner* — Krishnan S Menon

(57) ABSTRACT

Methods are disclosed to treat produced water from hydrocarbons production facilities. The disclosed methods can be used to either: (1) de-NORM produced water; or (2) de-NORM and partially de-salt produced water; or (3) de-NORM and partially de-salt and de-ionize produced water; or (4) de-oil, de-NORM, de-salt and de-ionize produced water.

20 Claims, 10 Drawing Sheets

METHODS TO TREAT PRODUCED WATER

BACKGROUND OF THE INVENTION

Formation waters are often produced concurrently with hydrocarbons. Higher amounts of produced water occur during the middle or later stage of the primary production after water breakthrough. A further increase in the amounts of produced water also occurs during the secondary treatment, in which large amounts of external saline water are injected from the surface into the reservoir formation to sustain hydrocarbons production. The amounts of produced waters in some cases could reach 90% or more of the total fluids produced.

Most produced waters are hyper-saline chloride-type that are rich in both sodium and calcium ions. The salinity of such produced waters could be 10-15 times higher than the salinity of seawater. Chloride-rich produced waters that are high in calcium are generally high in alkaline earth cations such as strontium, barium, and in some cases radium. Some of the naturally occurring isotopes of strontium (Sr-87) and barium (Ba-130 and Ba-132) are radioactive. In addition, the availability of radium in produced water suggests that the decay series of radium's isotopes is common and such water is radioactive.

As shown in FIGS. 1 and 2, radium sources in produced water are either uranium (U-238) or thorium (Th-232). U-238 and Th-232 exist in subsurface formations as immobile species whereas their daughter nuclides (radium and its isotopes) are transported to the surface via produced water. Once radium isotopes are leached from their lithological origin, they are no longer supported by their ancestors and thus they develop their own decay series.

Naturally Occurring Radioactive Materials (NORM) in produced water pose external (near any processing equipment) and internal (during maintenance or workover) radiation hazards. NORM also renders produced waters at the surface as radioactive waste streams. The cost of handling the NORM hazards is substantial (analysis, prevention if possible, treatment, transportation, storage, disposal, equipment decontamination and long-term liability).

Sine crude oil contains a large number (hundreds) of hydrocarbons, many of which are structurally undetermined or difficult to identify, the de-oiling of produced water is also an extensive and expensive process. Partial or near efficient de-oiling of produced water might be targeted by two or three conventional processing stages. In the first stage, sludge catchers (e.g., skimmers or any other basic oil separation equipment along with coalescer) are used to separate oil droplets with sizes greater than 100 microns. The second stage targets the removal of dispersed oil droplets with sizes greater than 15-20 microns. Corrugated plate separators or hydrocyclones or centrifuges or electrostatic dehydrators or induced gas flotation without chemical addition or a combination could be used in the second stage. The third (polishing) stage is used to separate oil contents with sizes of about 10 microns from produced water. Induced gas flotation with chemical addition or carbon adsorption or extraction (liquids or supercritical fluids or polymers) or filtration (microfiltration or ultrafiltration) are frequently used in the polishing stage.

Produced water is thus an unwanted waste stream that once its' brought to the surface it becomes too expensive to treat by conventional methods. The cheapest possible way to deal with produced water is probably direct disposal by re-injecting it without treatment into abandoned oil wells or dry holes or geologically selected injection wells or salt caverns. Such disposable sites, however, may not be easily available for producers (technically and/or environmentally prohibitive).

On the other hand, produced water in some areas might be too valuable to waste. However, the only way to offset the high treatment cost of produced water is to render it harmless (NORM removal) and to extract economic values (recovery of salts, usable water, and even oil) from it using innovative and cost effective methods.

Inspection of Table 1 reveals that at least three groups of inorganic species can be selectively segregated from produced water. In the first group of inorganic species, potential radioactive alkaline earth cations (strontium, barium and radium along with its decay series) in the form of sulfate can be selectively separated from produced water. Once produced water is selectively depleted of such radioactive and pyrophoric species, produced water can be used for applications such as oil-fields water injection operations, fire extinguishing and dust control in desert areas.

The second group of inorganic species may include the simultaneous or sequential separation of magnesium hydroxide (brucite) and calcium chloride (hydrophilite) from produced water as valuable commodities. The recovered brucite can be used as: (1) an agent to scrub air pollutants or to remove transition metals from aqueous streams; (2) a coagulant in water and wastewater treatment; (3) an acid neutralizer or a base stabilizer; and (4) an odor controller. The recovered hydrophilite can also be employed as a drilling fluid in oil-fields, corrosion controller, road de-icing, dust controller, concrete additive, soil additive, tire ballasting as well as other applications.

The third group of inorganic species in produced water includes sodium and potassium chloride (sylvinite). Sylvinite is a salt that consists of sodium and potassium chloride but dominated by sodium chloride. Sylvinite is the dominant salt in produced water, and thus it's partial or near complete separation from produced water will also produce partial or near complete de-ionization of produced water. Sylvinite can be used in applications such as road de-icing, animals feeding, water softening and food processing.

This patent provides innovative near zero- or zero-discharge methods that allow the conversion of produced waters as unwanted waste streams to reusable products. The first objective of this invention is to de-NORM and partially de-salt readily and sufficiently de-oiled produced water. The second objective of this invention is to de-NORM, and partially de-salt and de-ionize readily and sufficiently de-oiled produced water. The third objective of this invention is to de-oil, de-NORM, and partially de-salt and de-ionize produced water.

SUMMARY OF THE INVENTION

In one aspect, the present invention provides a method for separating alkaline earth cations, brucite and hydrophilite from produced water to produce partially de-salted produced water. The inventive method comprises the steps of (a) removing alkaline earth cations from produced water; (b) removing brucite from a second intermediate stream of produced water; (c) removing hydrophilite from a third intermediate stream of produced water; (d) injecting the partially de-salted produced water into subterranean formation for hydrocarbons recovery; or (e) using the partially de-salted produced water for oil-fields fire extinguishing; or (f) using the partially de-salted produced water for dust control; or (g) producing de-ionized water from the partially de-salted produced water by membrane distillation. Alkaline earth cations are removed from produced water in step (a) by: (i) pressurizing produced water into a first precipitator unit at pressure between 50 psi and 1,200 psi through at least one nozzle to produce a jet stream of produced water; (ii) pressurizing sulfate-rich saline water into the first precipitator unit at pressure between 50 psi and 1,200 psi through at least one nozzle to form a first intermediate stream and precipitates comprising alkaline earth cations by allowing the concentration of sulfate to exceed the concentration of strontium in the first intermediate stream; (iii) removing precipitates from the first intermediate stream by a first filter to produce alkaline earth cations slurry and a second intermediate stream; (iv) separating alkaline earth cations slurry into dewatered alkaline earth cations precipitates and a first liquor stream by a dewatering filter; and (v) recycling the first liquor stream to the first precipitator unit. Brucite is removed from the second intermediate stream in step (b) by: (i) pressurizing the second intermediate stream into a second precipitator unit at pressure between 50 psi and 1,200 psi through at least one nozzle to produce a jet stream of the second intermediate stream; (ii) pressurizing an amine solvent or an amine solvent with modifier into the second precipitator unit at pressure between 50 psi and the critical pressure of the amine solvent or the amine solvent with modifier through at least one nozzle to form precipitates comprising brucite from the second intermediate stream; (iii) removing precipitates from the second intermediate stream by a second filter to produce brucite slurry and a third intermediate stream; (iv) separating brucite slurry into dewatered brucite precipitates and a second liquor stream by a vacuum filter; (v) recovering at least most of the remaining amine solvent or amine solvent with modifier from the second liquor stream by the vacuum filter; and (vi) recycling the second liquor stream to the second precipitator unit. Hydrophilite is removed from the third intermediate stream in step (c) by: (i) pressurizing the third intermediate stream into a third precipitator unit at pressure between 50 psi and 1,200 psi through at least one nozzle to produce a jet stream of the third intermediate stream; (ii) pressurizing the amine solvent or the amine solvent with modifier into the third precipitator unit at pressure between 50 psi and the critical pressure of the amine solvent or the amine solvent with modifier through at least one nozzle to form precipitates comprising hydrophilite from the third intermediate stream; (iii) removing precipitates from the third intermediate stream by a third filter to produce hydrophilite slurry and a fourth intermediate stream; (iv) separating hydrophilite slurry into dewatered hydrophilite precipitates and a third liquor stream by a second vacuum filter; (v) recovering at least most of the remaining amine solvent or amine solvent with modifier from the third liquor stream by the second vacuum filter; (vi) recycling the third liquor stream to the third precipitator unit; and (vii) removing at least most of the amine solvent or amine solvent with modifier from the fourth intermediate stream by a stripping unit to produce the partially de-salted produced water.

Alkaline earth cations are strontium, barium, radium, radon, polonium, bismuth, thallium, lead, or a combination thereof. Brucite is magnesium hydroxide. Hydrophilite is calcium chloride. Produced water is oil-fields produced water, methane-bed produced water, coal-bed produced water, formation water, or a combination thereof. Sulfate-rich saline water is seawater, brine (concentrate) streams from pressure-driven or thermal-driven seawater desalination plants, sulfate-rich natural brine, agricultural drainage water, flue gas desulphurization water, or a combination thereof. The injection jet nozzle is coaxial nozzle, spray nozzle, vibrating nozzle, premixed nozzle, or a combination thereof. The amine solvent is selected from the group consisting of isopropylamine, propylamine, dipropylamine, diisopropylamine, ethylamine, diethylamine, methylamine, dimethylamine, or a combination thereof. The modifier for the amine solvents is nitrogen, nitrous oxide, or a combination thereof in liquid or gaseous state. The filter is hydrocyclone, microfiltration, ultrafiltration, vacuum filter, press filter, centrifugal filter, electrostatic filter, or a combination thereof. The stripping unit is flash tank, distillation column, vacuum distillation, vacuum membrane distillation, vacuum deaerator, pervaporation, or a combination thereof. The membrane distillation is vacuum membrane distillation, direct contact membrane distillation, membrane osmotic distillation, or a combination thereof.

In another aspect, the present invention provides a method for separating alkaline earth cations, brucite and hydrophilite from produced water to produce partially de-salted produced water. The inventive method comprises the steps of: (a) removing alkaline earth cations from produced water; (b) removing brucite from a second intermediate stream of produced water; (c) removing hydrophilite from a third intermediate stream of produced water; (d) injecting the partially de-salted produced water into subterranean formation for hydrocarbons recovery; (e) using the partially de-salted produced water for oil-fields fire extinguishing; or (f) using the partially de-salted produced water for dust control; or (g) producing de-ionized water from the partially de-salted produced water by membrane distillation. Alkaline earth cations are removed from produced water in step (a) by: (i) mixing sulfate-rich saline water with produced water to produce a first intermediate stream by allowing the concentration of sulfate to exceed the concentration of strontium in the first intermediate stream; (ii) pressurizing the first intermediate stream into a first precipitator unit at pressure between 50 psi and 1,200 psi through at least one nozzle to produce a jet stream of the first intermediate stream; (iii) pressurizing an amine solvent or an amine solvent with a modifier into the first precipitator unit at pressure between 50 psi and the critical pressure of the amine solvent or the amine solvent with modifier through at least one nozzle to form precipitates comprising alkaline earth cations from the first intermediate stream; (iv) removing precipitates from the first intermediate stream by a first filter to produce alkaline earth cations slurry and a second intermediate stream; (v) separating alkaline earth cations slurry into dewatered alkaline earth cations precipitates and a first liquor stream by a first vacuum filter; (vi) recovering at least most of the remaining amine solvent or amine solvent with modifier from the first liquor stream by the first vacuum filter; and (vii) recycling the first liquor stream to the first precipitator unit. Brucite is removed from the second intermediate stream in step (b) by: (i) pressurizing the second intermediate stream into a second precipitator unit at pressure between 50 psi and 1,200 psi through at least one nozzle to produce a jet stream of the second intermediate stream; (ii) pressurizing the amine solvent or the amine solvent with modifier into the second precipitator unit at pressure between 50 psi and the critical pressure of the amine solvent or the amine solvent with modifier through at least one nozzle to form precipitates comprising brucite from the second intermediate stream; (iii) removing precipitates from the second intermediate stream by a second filter to produce brucite slurry and a third intermediate stream; (iv) separating brucite slurry into dewatered brucite precipitates and a second liquor stream by a second vacuum filter; (v) recovering at least most of the remaining amine solvent or amine solvent with modifier from the second liquor stream by the second vacuum filter; and (vi) recycling the second liquor stream to the second precipitator unit. Hydrophilite is removed from the third intermediate stream in step (c) by: (i) pressurizing the third intermediate stream into a third precipitator unit at pressure between 50 psi and 1,200 psi through at least one nozzle to produce a jet stream of the third intermediate stream; (ii) pressurizing the amine solvent or the amine solvent with modifier into the third precipitator unit at pressure between 50 psi and the critical pressure of the amine solvent or the amine solvent with modifier through at least one nozzle to form precipitates comprising hydrophilite from the third intermediate stream; (iii) removing precipitates from the third intermediate stream by a third filter to produce hydrophilite slurry and a fourth intermediate stream; (iv) separating hydrophilite slurry into dewatered hydrophilite precipitates and a third liquor stream by a third vacuum filter; (v) recovering at least most of the remaining amine solvent or amine solvent with modifier from the third liquor stream by the third vacuum filter; (vi) recycling the third liquor stream to the third precipitator unit; and (vii) removing at least most of the amine solvent or amine solvent with modifier from the fourth intermediate stream by a stripping unit to produce the partially de-salted produced water.

In yet another aspect, the present invention provides a method for separating oil, alkaline earth cations, brucite and hydrophilite from produced water to produce de-oiled and partially de-salted produced water. The inventive method comprises the steps of: (a) separating oil from produced water by hydrophobic membranes to produce de-oiled produced water; (b) removing alkaline earth cations from the de-oiled produced water; (c) removing brucite from a second intermediate stream of de-oiled produced water; (d) removing hydrophilite from a third intermediate stream of de-oiled produced water; (e) injecting the de-oiled and partially de-salted produced water into subterranean formation for hydrocarbons recovery; or (f) using the de-oiled and partially de-salted produced water for oil-fields fire extinguishing; or (g) using the de-oiled and partially de-salted produced water for dust control; or (h) producing de-ionized water from the de-oiled and partially de-salted produced water by membrane distillation. Alkaline earth cations are removed from the de-oiled produced water in step (b) by: (i) pressurizing the de-oiled produced water into a first precipitator unit at pressure between 50 psi and 1,200 psi through at least one nozzle to produce a jet stream of the de-oiled produced water; (ii) pressurizing sulfate-rich saline water into the first precipitator unit at pressure between 50 psi and 1,200 psi through at least one nozzle to form a first intermediate stream and precipitates comprising alkaline earth cations by allowing the concentration of sulfate to exceed the concentration of strontium in the first intermediate stream; (iii) removing precipitates from the first intermediate stream by a first filter to produce alkaline earth cations slurry and a second intermediate stream; (iv) separating alkaline earth cations slurry into dewatered alkaline earth cations precipitates and a first liquor stream by a dewatering filter; and (v) recycling the first liquor stream to the first precipitator unit. Brucite is removed from the second intermediate stream in step (c) by: (i) pressurizing the second intermediate stream into a second precipitator unit at pressure between 50 psi and 1,200 psi through at least one nozzle to produce a jet stream of the second intermediate stream; (ii) pressurizing an amine solvent or an amine solvent with a modifier into the second precipitator unit at pressure between 50 psi and the critical pressure of the amine solvent or the amine solvent with modifier through at least one nozzle to form precipitates comprising brucite from the second intermediate stream; (iii) removing precipitates from the second intermediate stream by a second filter to produce brucite slurry and a third intermediate stream; (iv) separating brucite slurry into dewatered brucite precipitates and a second liquor stream by a vacuum filter; (v) recovering at least most of the remaining amine solvent or amine solvent with modifier from the second liquor stream by the vacuum filter; and (vi) recycling the second liquor stream to the second precipitator unit. Hydrophilite is removed from the third intermediate stream in step (d) by: (i) pressurizing the third intermediate stream into a third precipitator unit at pressure between 50 psi and 1,200 psi through at least one nozzle to produce a jet stream of the third intermediate stream; (ii) pressurizing the amine solvent or the amine solvent with modifier into the third precipitator unit at pressure between 50 psi and the critical pressure of the amine solvent or the amine solvent with modifier through at least one nozzle to form precipitates comprising hydrophilite from the third intermediate stream; (iii) removing precipitates from the third intermediate stream by a third filter to produce hydrophilite slurry and a fourth intermediate stream; (iv) separating hydrophilite slurry into dewatered hydrophilite precipitates and a third liquor stream by a second vacuum filter; (v) recovering at least most of the remaining amine solvent or amine solvent with modifier from the third liquor stream by the second vacuum filter; (vi) recycling the third liquor stream to the third precipitator unit; and (vii) removing at least most of the amine solvent or the amine solvent with modifier from the fourth intermediate stream by a stripping unit to produce the de-oiled and partially de-salted produced water.

In yet another aspect, the present invention provides a method for separating oil, alkaline earth cations, brucite and hydrophilite from produced water to produce de-oiled and partially de-salted produced water. The inventive method comprises the steps of (a) separating oil from produced water by hydrophobic membranes to produce de-oiled produced water; (b) removing alkaline earth cations from the de-oiled produced water; (c) removing brucite from a second intermediate stream of de-oiled produced water; (d) removing hydrophilite from a third intermediate stream of de-oiled produced water; (e) injecting the de-oiled and partially de-salted produced water into subterranean formation for hydrocarbons recovery; or (f) using the de-oiled and partially de-salted produced water for oil-fields fire extinguishing; or (g) using the de-oiled and partially de-salted produced water for dust control; or (h) producing de-ionized water from the de-oiled and partially de-salted produced water by membrane distillation. Alkaline earth cations are removed from the de-oiled produced water in step (b) by: (i) mixing sulfate-rich saline water with the de-oiled produced water to produce a first intermediate stream by allowing the concentration of sulfate to exceed the concentration of strontium in the first intermediate stream; (ii) pressurizing the first intermediate stream into a first precipitator unit at pressure between 50 psi and 1,200 psi through at least one nozzle to produce a jet stream of the first intermediate stream; (iii) pressurizing an amine solvent or an amine solvent with a modifier into the first precipitator unit at pressure between 50 psi and the critical pressure of the amine solvent or the amine solvent with modifier through at least one nozzle to form precipitates comprising alkaline earth cations from the first intermediate stream; (iv) removing precipitates from the first intermediate stream by a first filter to produce alkaline earth cations slurry and a second intermediate stream; (v) separating alkaline earth cations slurry into dewatered alkaline earth cations precipitates and a first liquor stream by a first vacuum filter; (vi) recovering at least most of the remaining amine solvent or amine solvent with modifier from the first liquor stream by the first vacuum filter; and (vii) recycling the first liquor stream to the first precipitator unit. Brucite is removed from the second intermediate stream in step (c) by: (i) pressurizing the second intermediate stream into a second precipitator unit at pressure between 50 psi and 1,200 psi through at least one nozzle to produce a jet stream of the second intermediate stream; (ii) pressurizing the amine solvent or the amine solvent with modifier into the second precipitator unit at pressure between 50 psi and the critical pressure of the amine solvent or the amine solvent with modifier through at least one nozzle to form precipitates comprising brucite from the second intermediate stream; (iii) removing precipitates from the second intermediate stream by a second filter to produce brucite slurry and a third intermediate stream; (iv) separating brucite slurry into dewatered brucite precipitates and a second liquor stream by a second vacuum filter; (v) recovering at least most of the remaining amine solvent or amine solvent with modifier from the second liquor stream by the second vacuum filter; and (vi) recycling the second liquor stream to the second precipitator unit. Hydrophilite is removed from the third intermediate stream in step (d) by: (i) pressurizing the third intermediate stream into a third precipitator unit at pressure between 50 psi and 1,200 psi through at least one nozzle to produce a jet stream of the third intermediate stream; (ii) pressurizing the amine solvent or the amine solvent with modifier into the third precipitator unit at pressure between 50 psi and the critical pressure of the amine solvent or the amine solvent with modifier through at least one nozzle to form precipitates comprising hydrophilite from the third intermediate stream; (iii) removing precipitates from the third intermediate stream by a third filter to produce hydrophilite slurry and a fourth intermediate stream; (iv) separating hydrophilite slurry into dewatered hydrophilite precipitates and a third liquor stream by a third vacuum filter; (v) recovering at least most of the remaining amine solvent or amine solvent with modifier from the third liquor stream by the third vacuum filter; (vi) recycling the third liquor stream to the third precipitator unit; and (vii) removing at least most of the amine solvent or amine solvent with modifier from the fourth intermediate stream by a stripping unit to produce the de-oiled and partially de-salted produced water.

This invention is not restricted to use in connection with one particular application. Further objects, novel features, and advantages of the present invention will be apparent to those skilled in the art upon examining the accompanying drawings and upon reading the following description of the preferred embodiments, or may be learned by practice of the invention.

DESCRIPTION OF THE PREFERRED EMBODIMENT

The Precipitation Concept

Figure 1:
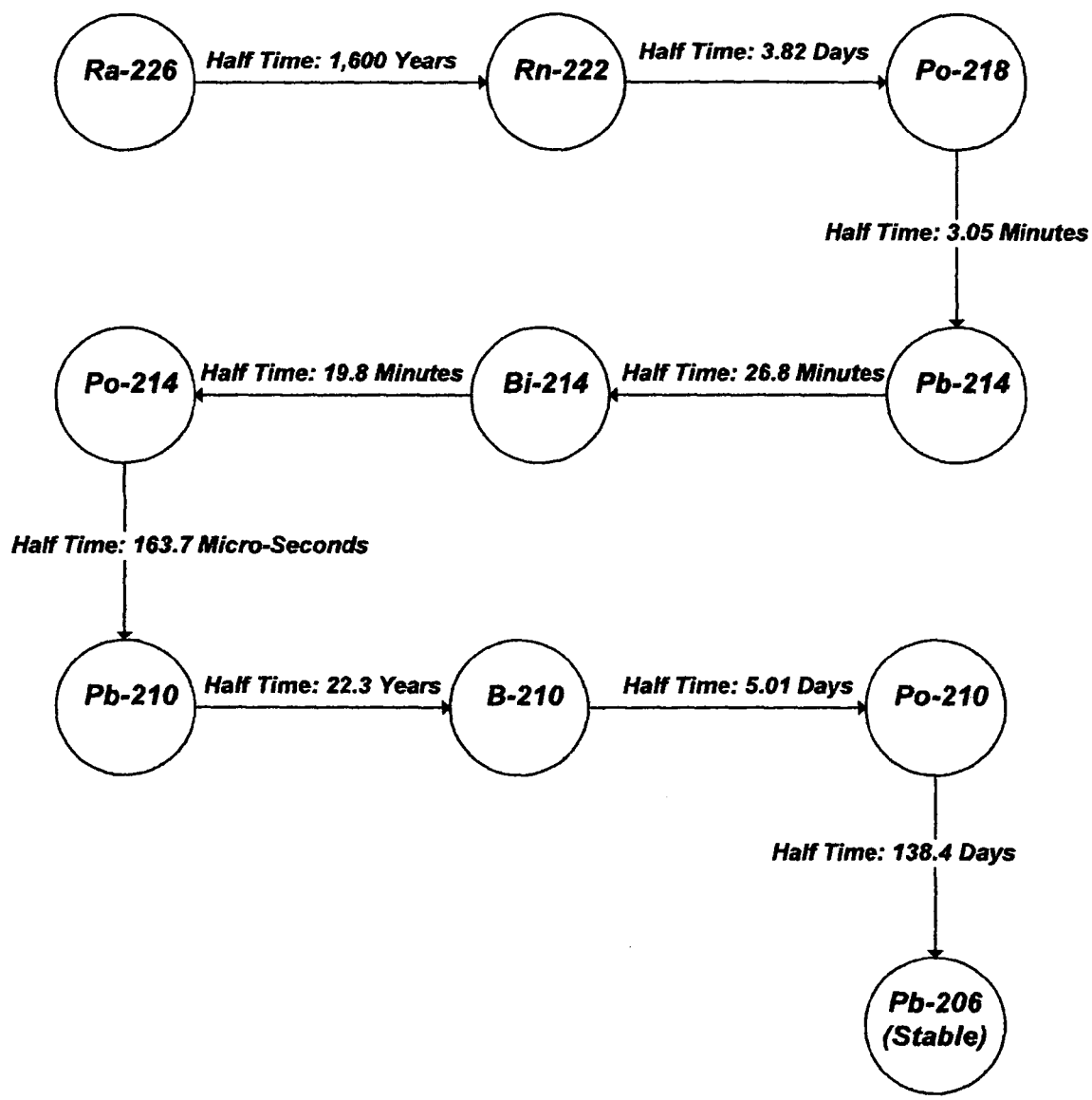
FIG. 1 illustrates the decay series of radium based on the uranium (U-238) source.
Figure 2:
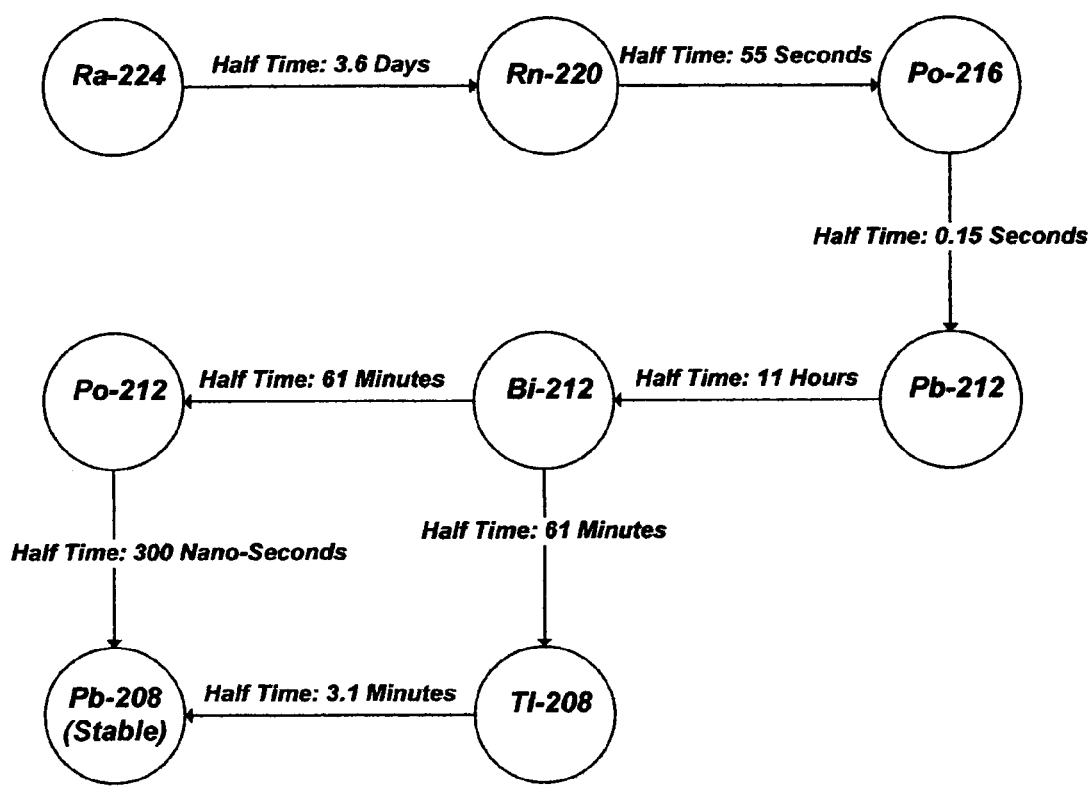
FIG. 2 illustrates the decay series of radium based on the thorium (Th-232) source.

I have previously invented the liquid-phase precipitation (LPP) process for the separation of inorganic species from aqueous streams. The effect of the separation in the LPP process is to intermix the aqueous solution with a suitable solvent at ambient temperature and atmospheric pressure to form selective precipitates. The suitable solvents are those which have the capability to meet two basic criteria.

The first criteria is the suitability to precipitate targeted inorganic species from aqueous solutions. The selected organic solvent must be miscible with the aqueous phase. Of equal importance, the targeted inorganic species must be sparingly soluble in the organic solvent. The addition of such a solvent to an inorganic-aqueous solution leads to the capture of part of the water molecules and reduces the solubility of inorganic species in the water which form insoluble precipitates. The solubility of the targeted inorganic species in the organic solvent is a critical factor in achieving the degree of saturation. Therefore, solubility related factors such as the ionic charge, ionic radius, and the presence of a suitable anion in an inorganic-aqueous solution and its effect on the pH rate of change play an important role in affecting and characterizing the formation of precipitates.

The second criteria is suitability for overall process design. For ease of recovery, the selected organic solvent must have favorable physical properties such as low boiling point, high vapor pressure, high relative volatility, and no azeotrope formation with water. From a process design standpoint, the selected solvent must have low toxicity since traces of the organic solvent always remain in the discharge stream. The solvent vapors are also of prime health and environmental concerns. Further, the selected solvent must be chemically stable, compatible with the process, and relatively inexpensive.

Several solvents have been identified for potential use in the LPP process. These solvents are isopropylamine (IPA), ethylamine (EA), propylamine (PA), dipropylamine (DPA), diisopropylamine (DIPA), diethylamine (DEA), and dimethylamine (DMA). However, IPA is the preferred solvent in the LPP process. The preference of IPA is attributed to its high precipitation ability with different basic salts, favorable properties (boiling point: 32.4° C.; vapor pressure: 478 mmHg at 20° C.); and minimal environmental risks. It should be pointed out that IPA salts have been used as a herbicide for agricultural purposes.

There is always, however, an interest in improving the performance of the LPP. Such improvements can be seen in two areas. The first improvement is to reach saturation faster, particularly for inorganic species with an intermediate aqueous solubility limit (more than sparingly soluble species). This would minimize the use of the amine solvent, and reduce the size of processing equipment. The second improvement is to produce controllable precipitates that are more uniformly distributed with high yield, and preferably in micron or submicron sizes. To achieve such improvements, the CPP process is invented.

In concept, the CPP is similar to the LPP. That is the targeted inorganic species must be nearly insoluble in the amine solvent, whereas the mother solvent (water), in which the inorganic species is dissolved in, is miscible with the amine solvent. However, the difference is that the amine solvent in the CPP is subject to pressure and/or temperature manipulations, and thus the amine solvent exhibits unusual thermophysical properties such as liquid-like density, higher diffusivity, higher compressibility, and lower viscosity.

The fast diffusion combined with low viscosity of the compressed amine solvent into the inorganic-aqueous phase produces faster supersaturation of the inorganic species and its possible precipitation in the desired micron size. Thus, the particle-size as well as the particle-size distribution, morphology, and crystal structure can be controlled. The achievement of faster supersaturation degree would, in turn, minimize the use of the amine solvent, and maximize the recovery of the amine solvent as well as the removal of the targeted inorganic species.

However, several related factors could influence the performance of the CPP process. These factors are: (1) the initial concentration and the mass flow rate of the targeted inorganic species in the saline stream; (2) the injection methods of both the saline stream and the amine solvent into the precipitator unit; and (3) the pressures and temperatures of both the saline stream and the amine solvent as well as the modification of the amine solvent. The following discussion highlights such factors.

The Targeted Ions and Ion Pairs in Produced Water

The CPP process can be employed as a standalone for the selective and sequential removal of inorganic species from oil-fields produced water and the like. The primary objective is to effectively: (1) deplete naturally occurring radioactive alkaline earth cations (strontium, barium and radium) in the form of sulfate from produced water; (2) recover magnesium in the form of hydroxide (brucite); and (3) recover calcium in the form of chloride (hydrophilite). The second objective is the overall economic attractiveness of the CPP process that lies within the optimum and minimum use of the precipitation solvent as well as the purity of the precipitated inorganic species as a waste (radioactive species) or salable by-products (brucite and hydrophilite) to offset the cost of the process. The third objective is to provide an environmentally benign (near zero- or zero-discharge) process by efficiently utilizing unwanted aqueous waste streams such as produced water from hydrocarbons production facilities by simultaneously rendering such streams harmless (removal of radioactivity) and producing valuable products (usable salts and water).

Produced waters from hydrocarbons production facilities are typically rich in alkaline earth cations such as calcium, strontium, barium and possibly radium. These cations exist in produced water in the soluble chloride forms. In the forms of sulfate, however, such cations are sparingly soluble in water.

Figure 3:
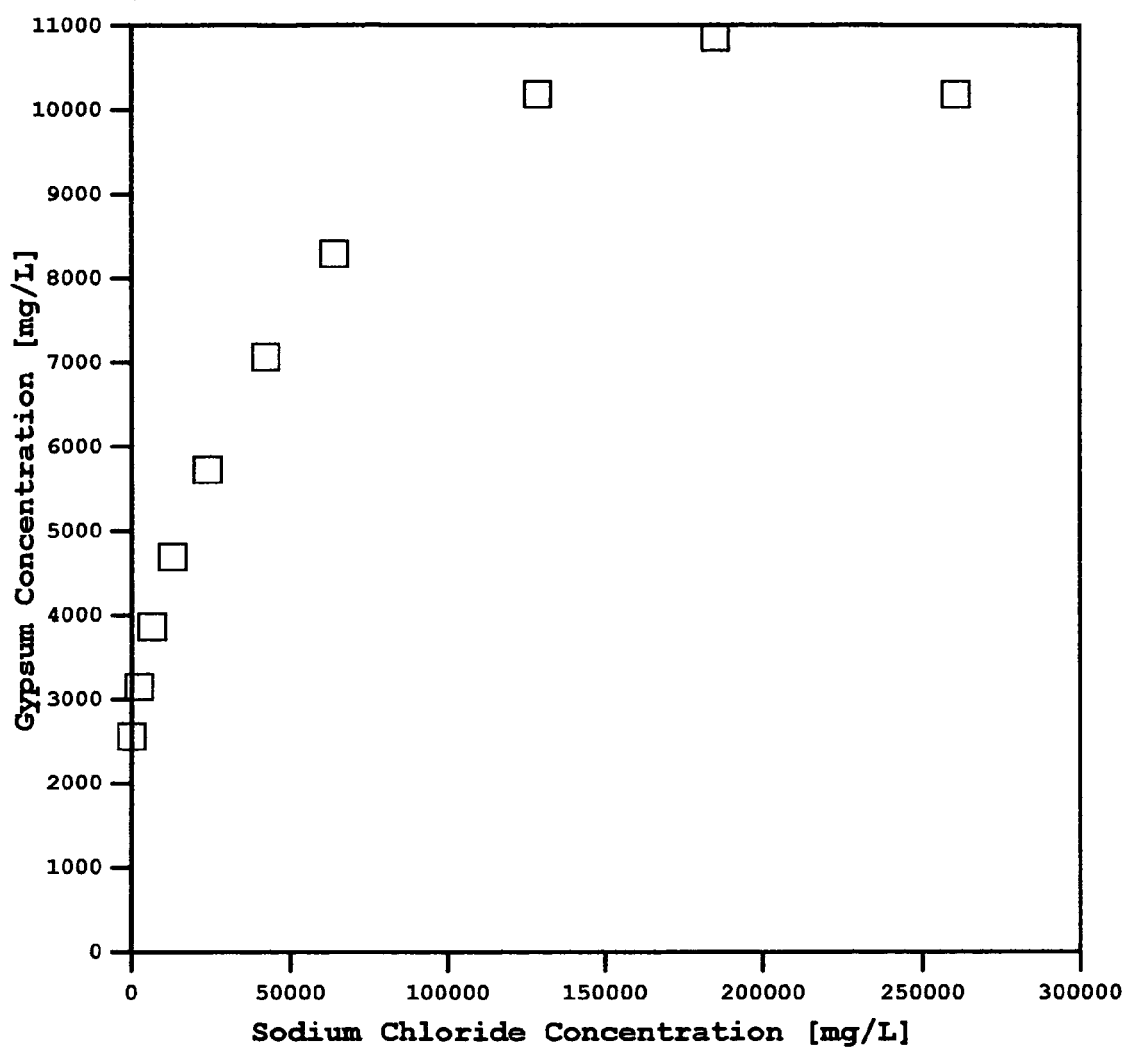
FIG. 3 illustrates the saturation limits of gypsum as a function of sodium chloride concentrations at ambient temperature.
Figure 4:
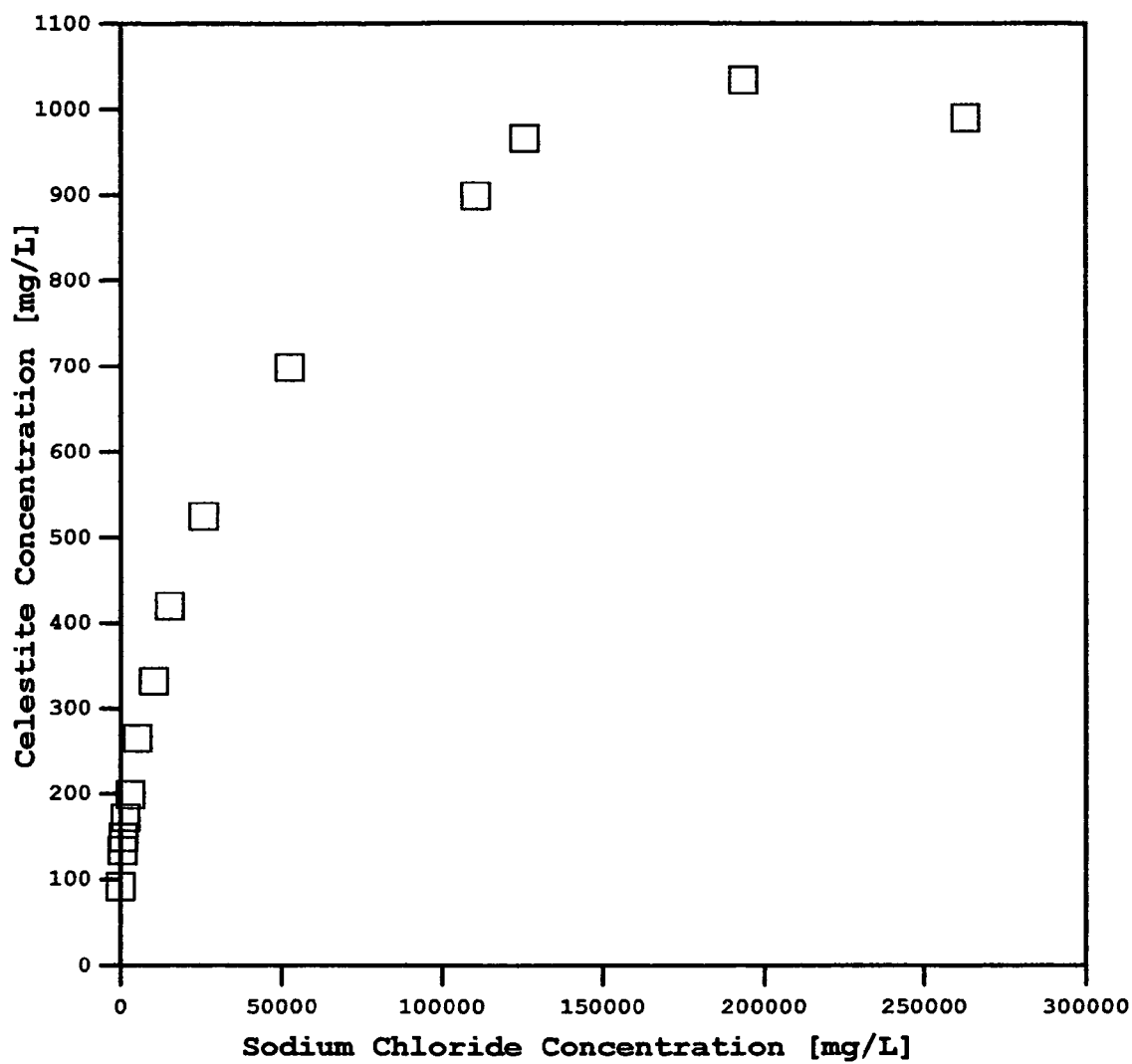
FIG. 4 illustrates the saturation limits of celestite as a function of sodium chloride concentrations at ambient temperature.
Figure 5:
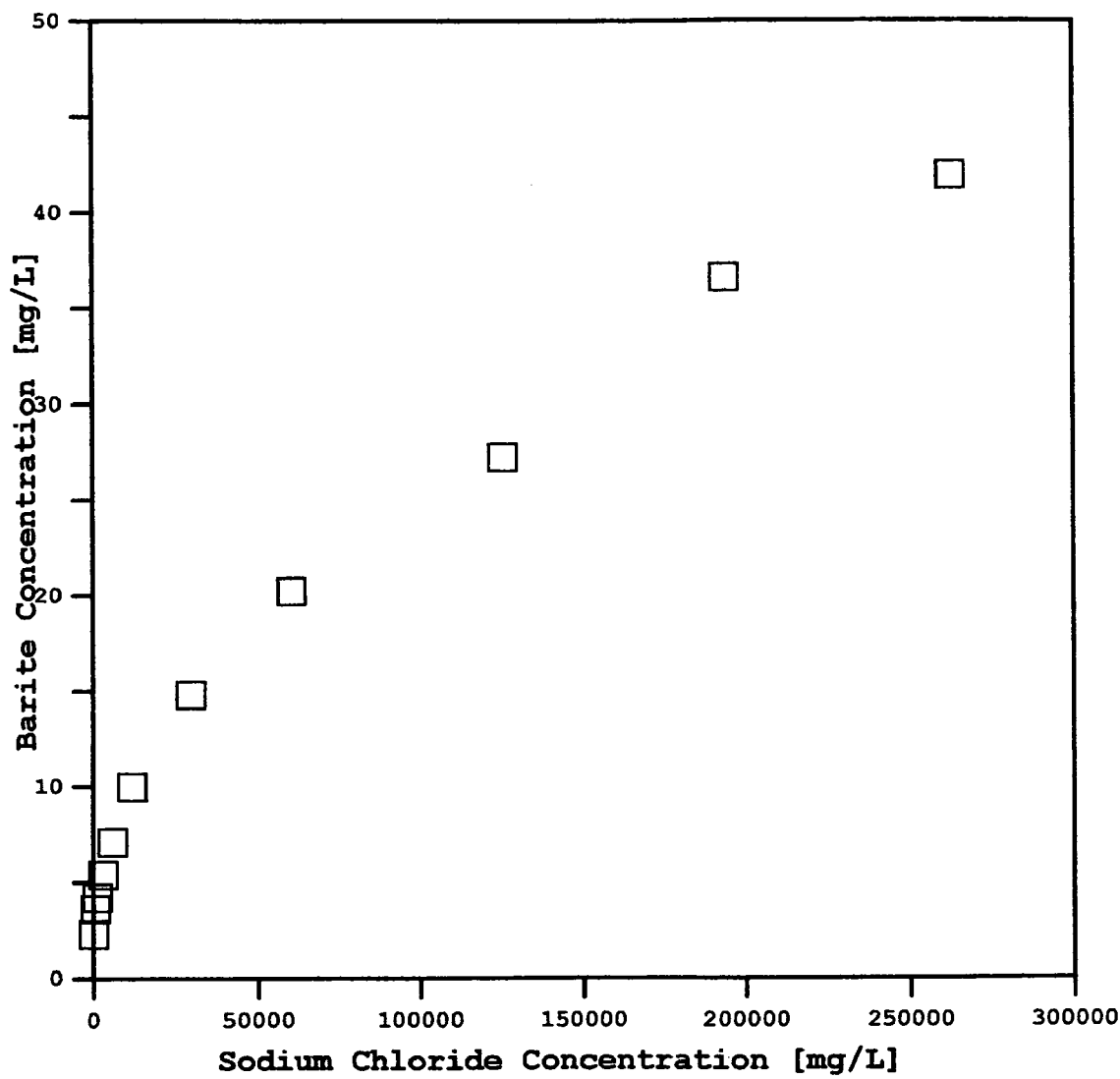
FIG. 5 illustrates the saturation limits of barite as a function of sodium chloride concentrations at ambient temperature.

FIGS. 3 to 5 show the solubility limits of calcium sulfate dihydrate (gypsum), strontium sulfate (celestite) and barium sulfate (barite) as a function of sodium chloride concentrations (the dominant salt in produced water) at ambient temperature. The solubility limit of gypsum is about an order of magnitude higher than the solubility limit of celestite while the solubility limit of celestite is about one and one-half orders of magnitude higher than the solubility limit of barite.

Since the naturally occurring radioactive isotopes of strontium (Sr-87) and barium (Ba-130 and Ba-132) may exist in produced water, and the chemical properties of radium are similar to barium, such species along with their radioactivity can be separated and isolated from produced water in the form of sulfate once produced water is brought to the surface. As shown in Table 1, there is typically a sufficient amount of sulfate (2.3 meq./L) in produced water to pair with barium (0.2 meq./L). If the removal of strontium (12.2 meq./L) is also desirable, however, there is a deficiency in amount of sulfate to completely pair with strontium in produced water.

The unbalanced and small portion of strontium in produced water can be matched (or exceeded) with sulfate from a sulfate-rich saline stream to precipitate strontium along with barium and radium in the form of sulfate without or with the aid of the amine solvent as a precipitation agent. Possible sources for sulfate as a seeding ion to precipitate strontium could be seawater, sulfate-rich natural brine, sulfate-rich agricultural drainage water, or brine from seawater desalination plants such as reverse osmosis (RO), Multi-Stage Flash (MSF), Multi-Effect Distillation (MED), and the like. Table 1 shows ions concentrations in a sample of produced water along with some samples of possible sulfate-rich saline streams.

Table 2 presents ions material balance between produced water and the required volume of sulfate-rich saline water to satisfy the unbalanced portion of strontium in the blended produced water and sulfate-rich saline water. To satisfy the precipitation of celestite, about 20% of total blended volume of produced water and sulfate-rich saline water should be supplied by seawater or sulfate-rich natural brine; or about 10% of such a total blended volume should be supplied by sulfate-rich brine from seawater desalination plants (RO or MSF or MED).

Since amine solvents are used as precipitation agents in the CPP process, the generated excess of hydroxide ions can be paired with the magnesium ion in produced water to form the sparingly soluble magnesium hydroxide (brucite). However, the selected amine solvents for the CPP process are weak bases, which do not furnish the hydroxide ion directly by dissociation. In addition, the volume of the selected amine solvent in the CPP process is expected to be extremely low compared to the volume of produced water. Thus, the pH of the mixed stream (the amine solvent and produced water) is the key to allow significant or insignificant selective precipitation of brucite.

Once strontium, barium, and radium in the form of sulfate along with brucite are selectively and sequentially separated from produced water, the remaining inorganic species in produced water would include hydrophilite and sylvinite. Hydrophilite can then be segregated from produced water in a separate CPP stage. It should be pointed out that hydrophilite and brucite can be co-precipitated in one CPP stage.

Jet Injection Methods

Various jet injection devices such as coaxial nozzles, spray nozzles, vibrating orifices or nozzles, premixed nozzles and others can be used in applying the CPP process. Although the effectiveness of the CPP process lies mainly in the ability of the amine solvents as a function of manipulating pressure, temperature, and other operating variables, the efficiency of the injection device (contact between the amine solvent and saline water) is of equal importance. If the nucleation (precipitate formation) and condensation (precipitate growth) mechanisms are fast enough, then precipitates will reach a high degree of supersaturation in a very short period of time and within the precipitator unit. This would allow appreciable reduction in the size of the precipitator unit. A significantly high degree of supersaturation, however, leads to smaller precipitates.

A possible jet injection method that can be used in the CPP process is a concentric nozzle. In such a nozzle, the produced water stream flows through the inner tube while the amine solvent flows through the coaxial annulus. Therefore, the main mechanism of the jet hydrodynamic mixing is that produced water draws in compressed amine fluid from the surrounding mass of such a fluid. The smaller the nozzle diameters are the higher the inlet velocities of the compressed fluids. This provides a more efficient micro-mixing. The highest nucleation of precipitates will take place at the border of the jet stream (region of contact). However, the highest condensation of precipitates will take place at the center of the jet stream due to the high turbulence impact and higher ions concentrations in the center of the jet.

A second possible injection method that can also be employed in the CPP process is that the compressed amine and produced water are injected into the precipitator unit via two separate spray nozzles. If the velocities of the injected fluids are not equal, then fast and/or a significantly high degree of supersaturation may not be achieved. Therefore, the induction and condensation periods for precipitates will be longer. This could affect the design of the precipitator unit (the possible need for a larger instead of a smaller precipitator unit, further mixing mechanisms such as a stirred precipitator unit, precipitates seeding step, etc.). However, a moderate degree of supersaturation leads to larger precipitates.

A third possible injection method is to use a mixing twin-fluid nozzle to co-introduce and pre-mix produced water with the amine solvent before entering the precipitation unit. This provides a simple and efficient injection method for intensive mass-transfer and fast nucleation of the targeted species.

Effect of Pressure, Temperature, and Amine Modifiers

Table 3 indicates that the selected amine solvents have relatively low critical pressures, and moderate critical temperatures. As the carbon number of the selected amine solvents increases, critical pressures decrease while critical temperatures (as well as boiling temperatures) increase. When the CPP is used as an enabling rather than a standalone process in conjunction with, for instance, pressure-driven membrane processes such as Nanofiltration (NF) or RO, the pressure of NF or RO concentrate stream would typically range, respectively, between 550 and 1,150 psi. One of the economical advantages is to conduct CPP within the critical pressure of the selected amine solvent. The critical pressures of the selected amine solvents vary between about 440 psi (DPA) and 1,090 psi (MA), which are within the pressure limits of NF or RO concentrate stream.

The critical temperatures of the selected amine solvents lie within the desired intermediate thermal region (127-327° C. or 400-600K), a thermal region that permits the stabilization of the kinetic phase rather than the thermodynamic phase. The temperatures range of produced water is typically between ambient and 50° C. Hence, it is economically preferable to operate the CPP process at the temperature of produced water. This can be achieved by either using a compressed amine solvent at a sub-critical temperature, or by matching the compressed amine solvent with an appropriate modifier to achieve mainly a lower critical temperature while maintaining the polarity, basicity, miscibility, and precipitating ability of the compressed amine in the targeted saline stream.

Molecules containing a hydrogen atom bonded to nitrogen, or oxygen, or fluorine form a strong dipole-dipole interaction and hydrogen bonding. Primary amines that are selected for the CPP process undergo hydrogen bonding. Thus, such amines are polar solvents and completely miscible in water. However, they are less polar than alcohols. This stems from the fact that the N—HN hydrogen bond between amine molecules is weaker than the O—HO hydrogen bond because nitrogen is less electronegative than oxygen, which results in low boiling points of primary amines.

Nitrous oxide ($N_2O$) or $N_2$ can be possible modifiers for the selected amine solvents since they are both miscible in amine solvents. $N_2O$ is a nontoxic low polarity fluid with favorable critical properties (almost similar to $CO_2$ except it has a permanent dipole moment). However, $N_2$ is an inert non-polar fluid with a very low critical temperature (−147° C. or 126.2 K) and a moderate critical pressure (490.8 psi or 33.4 atm) that is close to the critical pressures of the selected amine solvents. $N_2$ could potentially provide a critical temperature for a mixture of $N_2$ and a selected amine solvent that lies proximate to ambient temperature.

Since $N_2O$ and $N_2$ are sparingly miscible in water, however, the chosen modifier must be premixed and completely homogenized with the amine solvent before injection into the targeted saline stream. As such, the proportion of $N_2O$ or $N_2$ to the amine solvent ought to be carefully optimized to prevent any negative effects on the desired properties of the amine solvent in water.

De-NORM and Partially De-Salt Produced Water

Figure 6:
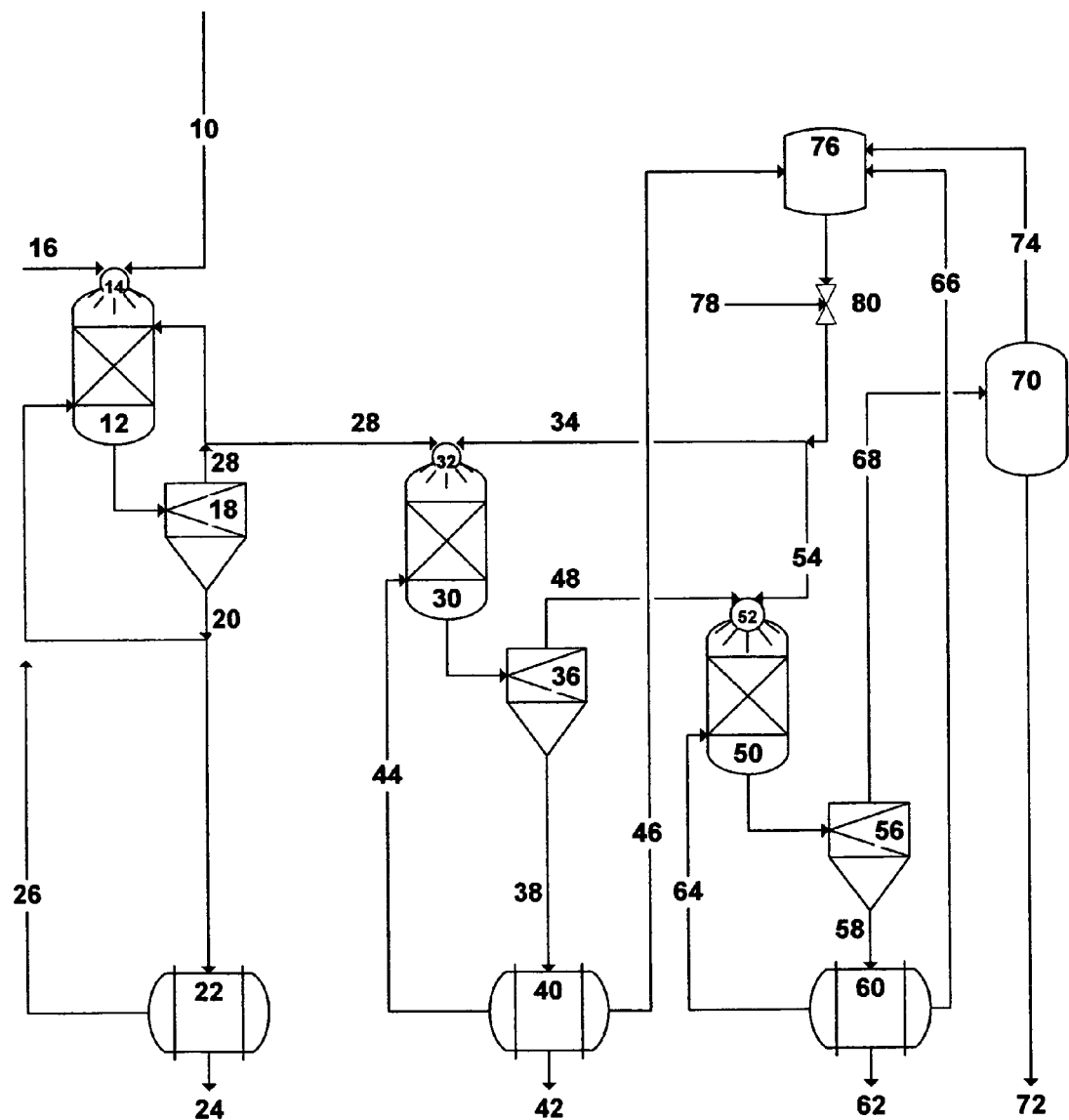
FIG. 6 illustrates a possible flow diagram for the invented method to de-NORM and partially de-salt readily and sufficiently de-oiled produced water.

CPP can be employed in three stages as a standalone process for the selective and sequential removal of NORM, brucite and hydrophilite from readily and sufficiently de-oiled produced water. FIG. 6 depicts a simplified possible flow diagram illustrating the three stages of the CPP process to de-NORM and partially de-salt produced water in which the first stage to de-NORM produced water is conducted without the aid of the amine solvent as a precipitation agent.

In the first stage of the CPP process, a de-oiled produced water stream [10] will be injected into the first precipitator unit [12] preferably via the inner tube of at least one concentric nozzle [14]. The pressure of the de-oiled produced water is between 50 and 1,200 psi. An appropriate amount of sulfate-rich saline stream (Table 2) [16] will simultaneously be injected into the first precipitator unit [12] at a pressure ranging between 50 and 1,200 psi preferably through the coaxial annulus of the same concentric nozzle [14] to allow the concentration of sulfate (meq./L) to slightly exceed the concentration of strontium (meq./L) in the blended produced water and sulfate-rich saline water.

The outlet stream of the first precipitator unit [12] will be fed into the first thickener-stage of hydrocyclones [18] to separate the formed precipitates (mainly strontium, barium, radium and radium's isotopes) from produced water. To enhance the precipitates size (if needed), the under flow stream [20] of the hydrocyclones [18] can be partially recycled to the bottom of the first precipitator unit [12] while the over flow stream [28] can also be partially recycled to the top of the same precipitator unit [12].

If produced water contains radium and/or the radioactive isotopes of strontium (Sr-87) and barium (Ba-130 and Ba-132), then the slurry in the under flow stream [20] of the hydrocyclones [18] will be dewatered by a press filter or a decanting centrifuge [22]. The dewatered radioactive precipitates [24] will be transferred to a suitable disposal site and the recovered water [26] from the press filter or decanting centrifuge [22] that contains very fine precipitates will be recycled to the bottom of the first precipitator unit [12].

However, if produced water does not contain radium and/or the radioactive isotopes of strontium and barium, then the slurry in the under flow stream [20] or the dewatered precipitates [24] that contains at least barium sulfate can be used, for instance, as a weighting agent to control oil gushing in drilling new wells.

In the second stage of the CPP process, brucite is targeted for selective separation from produced water. In this second stage, the over flow stream [28] from the first stage of hydrocyclones [18] that is nearly completely free of strontium, barium, radium and radium's isotopes will be injected into the second precipitator unit [30] preferably via the inner tube of at least one concentric nozzle [32]. The pressure of such a stream [28] is between 50 and 1,200 psi. A selected amine solvent [34] will simultaneously be injected into the second precipitator unit [30] at a pressure ranging between 50 psi and the critical pressure of the amine solvent preferably through the coaxial annulus of the same concentric nozzle [32] to selectively precipitate brucite.

To reduce the critical temperature of the amine solvent, if needed, the selected amine solvent from it is storage tank [76] can also be pre-mixed with $N_2$ or $N_2O$ [78] in a mixer [80]. In the case of modifying the amine solvent, the miscible binary mixture of the selected amine solvent and its modifier ($N_2$ or $N_2O$) [34] instead of the pure amine solvent will be pressurized into the second precipitator unit [30] via the coaxial annulus of the concentric nozzle [32] to contact the produced water stream [28] that will be pressurized separately via the inner tube of the same concentric nozzle [32].

The outlet stream from the second precipitator unit [30] will be fed into the second thickener-stage of hydrocyclones [36] to separate the formed brucite precipitates from the stream. The brucite slurry in the under flow stream [38] of the hydrocyclones [36] will be dewatered by a vacuum filter [40]. The dewatered brucite precipitates [42] will be recovered as a valuable commodity and the recovered water [44] that contains very fine precipitates will be recycled to the bottom of the second precipitator unit [30]. The preference of using a vacuum filter [40] instead of a press filter or a decanting centrifuge is to recover any remaining amine solvent. The recovered amine solvent [46] will be recycled to the amine storage tank [76].

In the third stage of the CPP process, hydrophilite is targeted for selective separation from produced water. The over flow stream [48] from the second stage of hydrocyclones [36] that is nearly free of strontium, barium, radium and radium's isotopes as well as brucite will be injected into the third precipitator unit [50] preferably via the inner tube of at least one concentric nozzle [52]. The pressure of such a stream [48] will be between 50 and 1,200 psi. The selected amine solvent will simultaneously be injected [54] into the third precipitator unit [50] at a pressure ranging between 50 psi and the critical pressure of the amine solvent preferably through the coaxial annulus of the same concentric nozzle [52] to selectively precipitate hydrophilite.

To reduce the critical temperature of the amine solvent, if needed, the amine solvent can be mixed with $N_2$ or $N_2O$ [78] in a mixer [80]. In the case of modifying the amine solvent, the miscible binary mixture of the selected amine solvent and its modifier ($N_2$ or $N_2O$) [54] instead of the pure amine solvent will be pressurized into the third precipitator unit [50] via the coaxial annulus of the concentric nozzle [52] to contact the produced water stream [48] that will be pressurized separately via the inner tube of the same concentric nozzle [52].

The outlet stream from the third precipitator unit [50] will be fed into the third thickener-stage of hydrocyclones [56] to separate the formed hydrophilite precipitates from the stream. The hydrophilite slurry in the under flow stream [58] of the hydrocyclones [56] will be dewatered by a vacuum filter [60]. The dewatered hydrophilite precipitates [62] will be recovered as a valuable commodity and the recovered water [64] that contains very fine precipitates will be recycled to the bottom of the third precipitator unit [50]. The vacuum filter [60] is also used to recover any remaining amine solvent. The recovered amine solvent [66] will be recycled to the amine storage tank [76].

The over flow stream [68] of the third stage of hydrocyclones [56] that contains the amine solvent and produced water that is rich with nearly only sylvinite will be fed into a vapor-liquid equilibrium based stripping unit [70] to separate the nearly only sylvinite rich produced water [72] from the amine solvent [74]. The stripping unit could be a flash drum, a vacuum or standard distillation tower, a vacuum membrane distillation, a vacuum deaerator, or a pervaporation. The recovered amine solvent [74] will be recycled to the amine storage tank [76]. The nearly only sylvinite-rich produced water [72] can be used for, but not limited to, oil-fields saline water injection operations or fire extinguishing in oil fields or dust control.

It should be understood that multiple precipitator units in each stage of the CPP process instead of a single precipitator unit can be implemented as needed.

It should also be understood that multiple concentric nozzles can be installed within a single precipitator unit in any given stage of the CPP process.

It should also be understood that the amine solvent (or sulfate-rich saline water) and produced water can be injected into the precipitator unit via two or multiple but separate spray nozzles.

It should also be understood that the amine solvent (or sulfate-rich saline water) and produced water can be co-injected via a mixing twin-fluid nozzle or multiple mixing twin-fluid nozzles before entering the precipitator unit.

It should also be understood that hydrocyclones in the CPP process can be replaced by other appropriate liquid-solid filtration units such microfiltration, ultrafiltration, decanting centrifuge, or a combination thereof.

It should also be understood that the CPP process can be implemented, for instance, in: (1) a single-stage to only de-NORM produced water; or (2) a dual-stage to de-NORM produced water and then to recover brucite; or (3) a triple-stage to de-NORM produced water and then to separately and sequentially recover brucite and hydrophilite; or (4) a dual-stage to de-NORM produced water in the first stage and then to recover a blend of brucite and hydrophilite in the second stage. The treated produced water from such processing schemes can also be used, but not limited to, for oil-fields water injection operations, fire extinguishing, or dust control.

Figure 7:
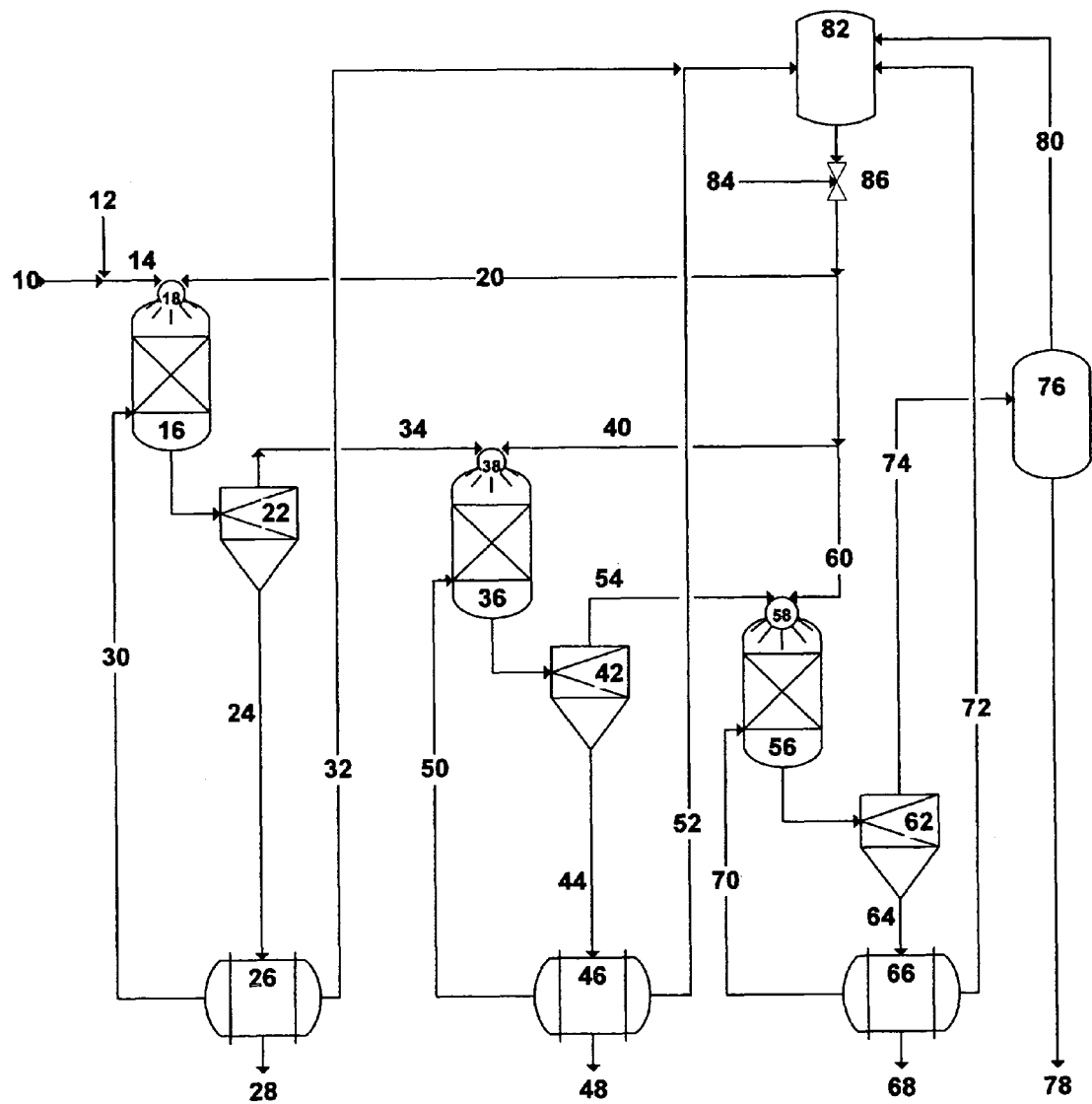
FIG. 7 illustrates another possible flow diagram for the invented method to de-NORM and partially de-salt readily and sufficiently de-oiled produced water.

Alternatively, FIG. 7 depicts a simplified possible flow diagram illustrating the three stages of the CPP process to de-NORM and partially de-salt produced water in which the first stage to de-NORM produced water is conducted with the aid of a selected amine solvent as a precipitation agent. In the first stage of the CPP process, de-oiled produced water [10] will be pre-mixed with a sufficient amount of sulfate rich saline water [12] to allow the concentration of sulfate (meq./L) to exceed the concentration of strontium (meq./L) in the blended saline stream [14] (Table 2). The blended saline stream [14] will be injected into the first precipitator unit [16] preferably via the inner tube of at least one concentric nozzle [18]. The pressure of such a blended saline stream is between 50 and 1,200 psi. A selected amine solvent will simultaneously be injected [20] into the same precipitator unit [16] at a pressure ranging between 50 psi and the critical pressure of the amine solvent preferably through the coaxial annulus of the same concentric nozzle [18].

The outlet stream from the first precipitator unit [16] will be fed into the first thickener-stage of hydrocyclones [22] to separate the formed precipitates (mainly strontium, barium, radium and radium's isotopes). The slurry in the under flow stream [24] of the hydrocyclones [22] will be dewatered by a vacuum filter [24]. The dewatered precipitates [28] will be transferred to a suitable disposal site (if they are radioactive) or recovered as valuable commodities (if they are not radioactive). The recovered water [30] from the vacuum filter [26] that contains very fine precipitates will be recycled to the bottom of the first precipitator unit [16]. The recovered amine solvent [32] from the vacuum filter [26] will be recycled to the amine storage tank [82].

The remaining processing steps (34-86) in FIG. 7 are identical to the previously described processing steps (28-80) in FIG. 6.

Integration of the Precipitation Concept with the Hydrophobic Membranes Concept

Figure 8:
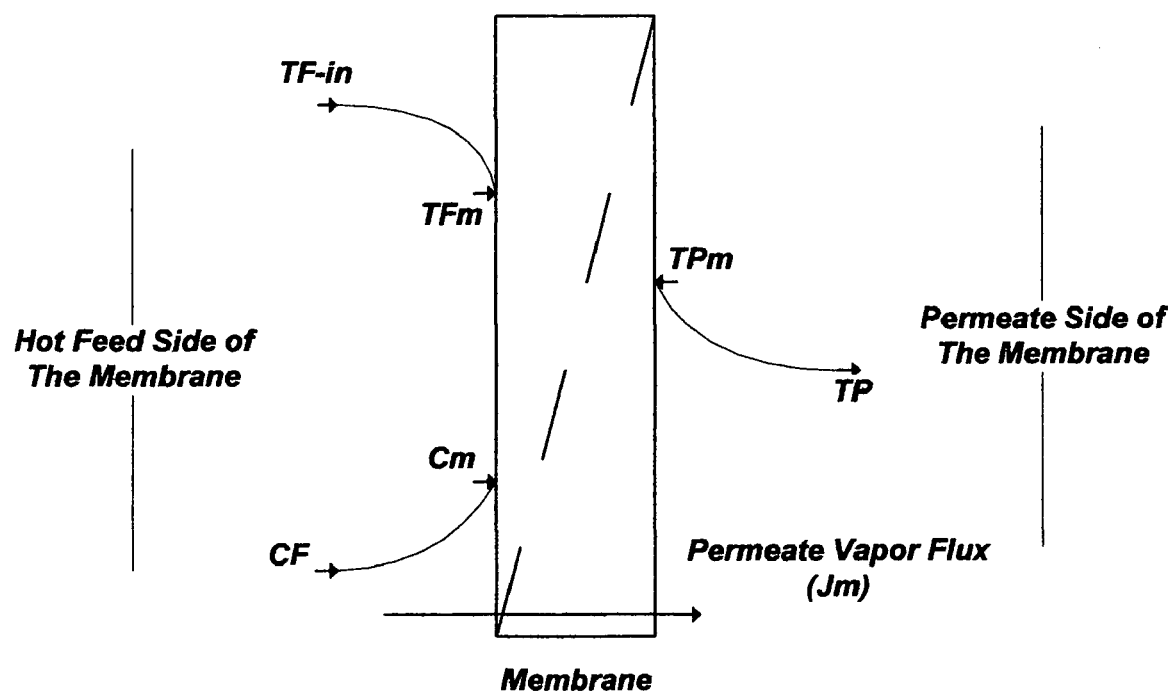
FIG. 8 illustrates a simplified schematic diagram for the flow direction and the polarization of temperature and concentration in Membrane Distillation.

Membrane Distillation (MD) refers to the transport of the vapor phase through pores of a hydrophobic membrane that separate two liquid streams. The liquid streams cannot enter the membrane pores unless the applied pressure is greater than the specified "capillary or liquid entry" pressure for the porous partition of a given membrane. In the absence of such a pressure, vapor-liquid interfaces are formed on both sides of the membrane pores due to surface tension forces. Under these conditions, if a temperature difference is applied, a vapor pressure gradient will be created on both interfaces. Evaporation will take place at the hot membrane interface (feed), water vapor will transport through the membrane pores with a convective and/or diffusion mechanism, and vapor condensation will take place at the cold side of the membrane interface (permeate). Thus, the net permeate vapor flux will be from the hot feed stream to the cold condensate stream. FIG. 8 shows a simplified schematic diagram for the flow direction in MD.

MD has several clear advantages compared to conventional pressure-driven membranes (e.g., RO) or thermal-driven (e.g., MSF, MED and the like) desalination processes. First, MD can take place at a very low pressure that is slightly above atmospheric pressure (e.g., 15 psi), which is contrary to RO that ought to be operated at high pressures (e.g., 1,100-1200 psi) to exceed the natural osmotic pressure of the saline stream (e.g., seawater) and to achieve the required recovery. It is worth noting that RO is inapplicable to most produced waters due to their high osmotic pressures.

Second, MD can be conducted at temperatures that are significantly lower than the boiling point of water (e.g., 40-70° C.). Any form of waste heat (e.g., the inherited thermal energy within produced water along with gas flares within the producing oil fields or gathering centers) or low grade energy sources (wind or solar or geothermal or solar ponds) can be used to operate MD.

Third, the MD product stream from any saline streams that contain non-volatile ions is an ultra-pure. Entrainment of dissolved ions in the product stream, as in the case with RO (or NF), is avoided. For an oil producer, the MD product stream would be ideally suited for applications such as enhanced oil recovery (EOR) by stream injection or desalting crude oil (wash water).

Fourth, the evaporation surface of MD can be made similar to the available various pressure-driven membrane modules (e.g., hollow fiber, spiral wound, etc.). The modularity of MD thus allows the ease of adding processing capacity as needed.

The apparent simplicity of MD, however, obscures complex and simultaneous mass and heat transfer interactions. The mass water vapor flux in MD is a function of the "membrane permeability coefficient" ($K_m$) and the vapor pressure difference across the membrane:

$$J_m = K_m[p_{Fm}^s(T_{Fm}) - p_p] \quad (1)$$

where $p_{Fm}^s$ is the saturated vapor pressure of the hot feed stream at the membrane surface temperature ($T_{Fm}$) rather than the bulk (inlet) feed temperature ($T_F$), and $p_p$ is the permeate stream pressure. $K_m$ is a function of the membrane structure such as porosity ($\epsilon$), pore size radius (r), thickness ($\delta$), and tortuosity ($\chi$):

$$K_m = \frac{2\epsilon r}{3\chi\delta} \frac{1}{RT} \sqrt{\frac{8RT}{\pi}} \quad (2)$$

$T_{Fm}$, as the driving force for the water vapor flux across the membrane, not only affects the vapor-liquid equilibrium in the feed stream but also affects the hydrodynamics in the feed stream liquid phase since its dependent on salts concentrations at the membrane surface.

As water evaporation in MD takes place, the viscosity of saline water feed stream increases with increasing salts concentrations. This would elevate the osmotic pressure, depress the vapor pressure, and alter heat and mass transfer coefficients across the membrane boundary layers. The saturated vapor pressure of saline water can be related to its osmotic pressure as follows:

$$p_{Fm}^s = \frac{p^o}{\exp\left[\frac{\Pi_{Fm}\tilde{v}_w}{RT_{Fm}}\right]} \quad (3)$$

where at $T_{Fm}$, $p_{Fm}^s$ is the saturated vapor pressure of a saline stream (mmHg), $p^o$ is the vapor pressure of pure water (mmHg), $\Pi_{Fm}$ is the osmotic pressure of a saline stream (psi), $\tilde{v}_w$ is the water molar volume (L/gmol), and R is the ideal gas constant (L psi/gmol K).

$p^o$ can be accurately estimated using Antoine equation. The osmotic pressure ($\Pi_{Fm}$) of a saline stream can be estimated as follows:

$$\Pi = 1.19 T_{Fm} \Sigma M_i \quad (4)$$

where $M_i$ is the molar concentration of individual ions (mol/L).

Eqs. (1) to (3) imply that in order to enhance or achieve an acceptable level of the water vapor flux, the value of either $K_m$ or $T_{Fm}$ or both values must be increased. As given in Eq. (2), the membrane structure is the key to optimize $K_m$. The $K_m$ value of hydrophobic membranes is typically very low (e.g., about 0.21 Kg/m²·hr·mmHg) to prevent water in the liquid phase from passing through the membrane pores. A slight increase in the $K_m$ value is possible, which could drastically improve water vapor flux, but it should not be at the expense of the loosing the membrane hydrophobicity. As such, a balance ought to be strike between improving the value of $K_m$ and maintaining the membrane hydrophobicity.

$K_m$ is also, to some degree, temperature dependent (decreases by 3% with a 10° C. increase in the mean temperature). The molecular mean free path for water vapor at 60° C. is about 0.3 μm. If convective transport is dominant across the membrane, the controlling factor will be the membrane pore size. If diffusive transport is dominant, however, the controlling factor will be the average mole fraction of air present within the membrane pores. Using inappropriate small membrane pore size combined with an increase in the feed stream temperature range (e.g., above 60° C.) could subsequently lead to an unintended reduction in $K_m$.

The key in increasing the value $T_{Fm}$ lies within: (1) the type of the condensation method on the permeate side of the membrane; (2) the characteristics of the membrane module and flow regime along with operating conditions including the feed stream temperature and flow rate and the permeate stream pressure; and (3) controlling the solubility limits of inorganic salts in the saline feed stream, particularly the sparingly soluble salts that pare scale prone species.

De-NORM and Partially De-Salt/De-Ionize Produced Water

If the CPP process is used to de-NORM and partially de-salt produced water (as given in the processing steps of FIGS. 6 and 7), then the treated produced water will be nearly completely dominated with sylvinite. The CPP process would thus allow the operation of MD in a complete scale-free manner to produce de-ionized water and sylvinite.

Figure 9:
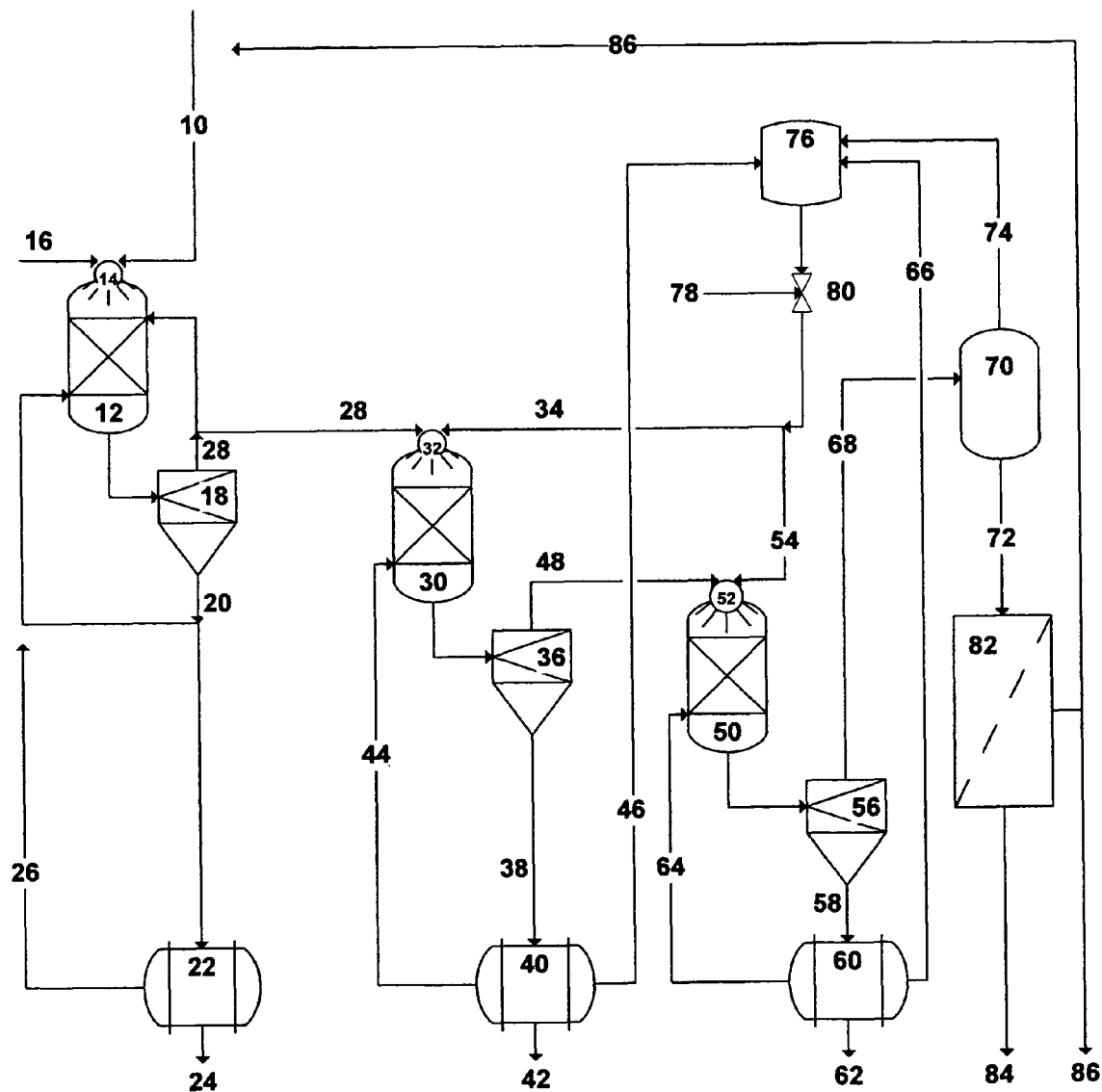
FIG. 9 illustrates a possible flow diagram for the invented method to de-NORM, and partially de-salt and de-ionize readily and sufficiently de-oiled produced water.

FIG. 9 shows an oversimplified flow diagram for the integration of CPP with MD to de-NORM, and partially de-salt and de-ionize produced water. The processing steps [10-80] in FIG. 9 are identical to the previously described processing steps [10-80] in FIG. 6. In such processing steps [10-80] of FIG. 9, the CPP process will be conducted to sequentially separate NORM, brucite and hydrophilite from produced water. As shown in FIG. 9, MD [82] will then be conducted to produce de-ionized water [84] and sylvinite rich stream or slurry [86]. Depending on the saturation level of the recovered sylvinite rich stream [86], it can partially be recycled to the produced water feed stream [10] or recovered as a slurry or salt.

It should be understood that the CPP stages in the integrated CPP-MD can be conducted, for instance, in: (1) a single-stage to only de-NORM produced water; or (2) a dual-stage to de-NORM produced water and then to recover brucite; or (3) a triple-stage to de-NORM produced water and then to separately and sequentially recover brucite and hydrophilite; or (4) a dual-stage to de-NORM produced water in the first stage and then to recover a blend of brucite and hydrophilite in the second stage. The treated produced water from such CPP processing schemes can then be de-ionized by MD.

De-Oil, De-NORM and Partially De-Salt/De-Ionize Produced Water

The natural demulsification of oil-brine liquid phases starts in some oil reservoirs where oil might preferentially squeeze through the narrow pores of organically surface coated rocks (oil wet sandstone or limestone or dolomite) and trapped by impermeable rocks (clay or shale). In such a natural downhole capillary flow, no shear or differential velocity (velocity is in the direction of the flow) or oil droplets rotation are induced. Thus, capillary flow is the most efficient method to separate oil droplets from water.

My concept is simply analogous to the natural demulsification phenomenon of crude oil. The concept takes advantages of the facts that dispersed oil droplets and produced water are immiscible and a properly configured hydrophobic membrane would efficiently repel water (the non-wetting liquid) and allow oil droplets (the membrane wetting species) to permeate through the hydrophobic membrane by applying a very low pressure.

However, such water repellent membranes do not permit passage of water through the membrane until the water capillary pressure ($p_c$) of the membrane is exceeded. $p_c$ depends on the interfacial tension, contact angle, and the pore size distribution of the membrane as reflected by the following relation:

$$p_c = \frac{2\tau_{w-o}\cos\theta_{w-o}}{r} \quad (5)$$

where $\tau_{w-o}$ is the water-oil interfacial tension, $\theta_{w-o}$ is the contact angle of a water droplet on the membrane surface in the presence of oil, r is the radius of the membrane pore.

The value of the $\theta_{w-o}$ can be related to various interfacial tensions as follows:

$$\cos\theta_{w-o} = \frac{\tau_{m-w} - \tau_{m-o}}{\tau_{w-o}} \quad (6)$$

where $\tau_{m-w}$ is interfacial tension of a membrane in contact with water, and $\tau_{m-o}$ is the interfacial tension of the same membrane in contact with oil. If $\tau_{m-w}$ is greater than $\tau_{m-o}$, then the membrane is hydrophobic ($0<\theta_{w-o}<90°$). This means that the value of $p_c$ is positive and thus the membrane is oil wet that permits the passage of oil droplets and repels water. If, however, $\tau_{m-w}$ is lower than $\tau_{m-o}$, then the membrane is hydrophilic ($\theta_{w-o}>90°$). This means that the value of $p_c$ is negative, and the membrane is water wet that permits the passage of water and prevents oil droplets from entering the membrane pores against the applied pressure ($p_a$).

Figure 10:
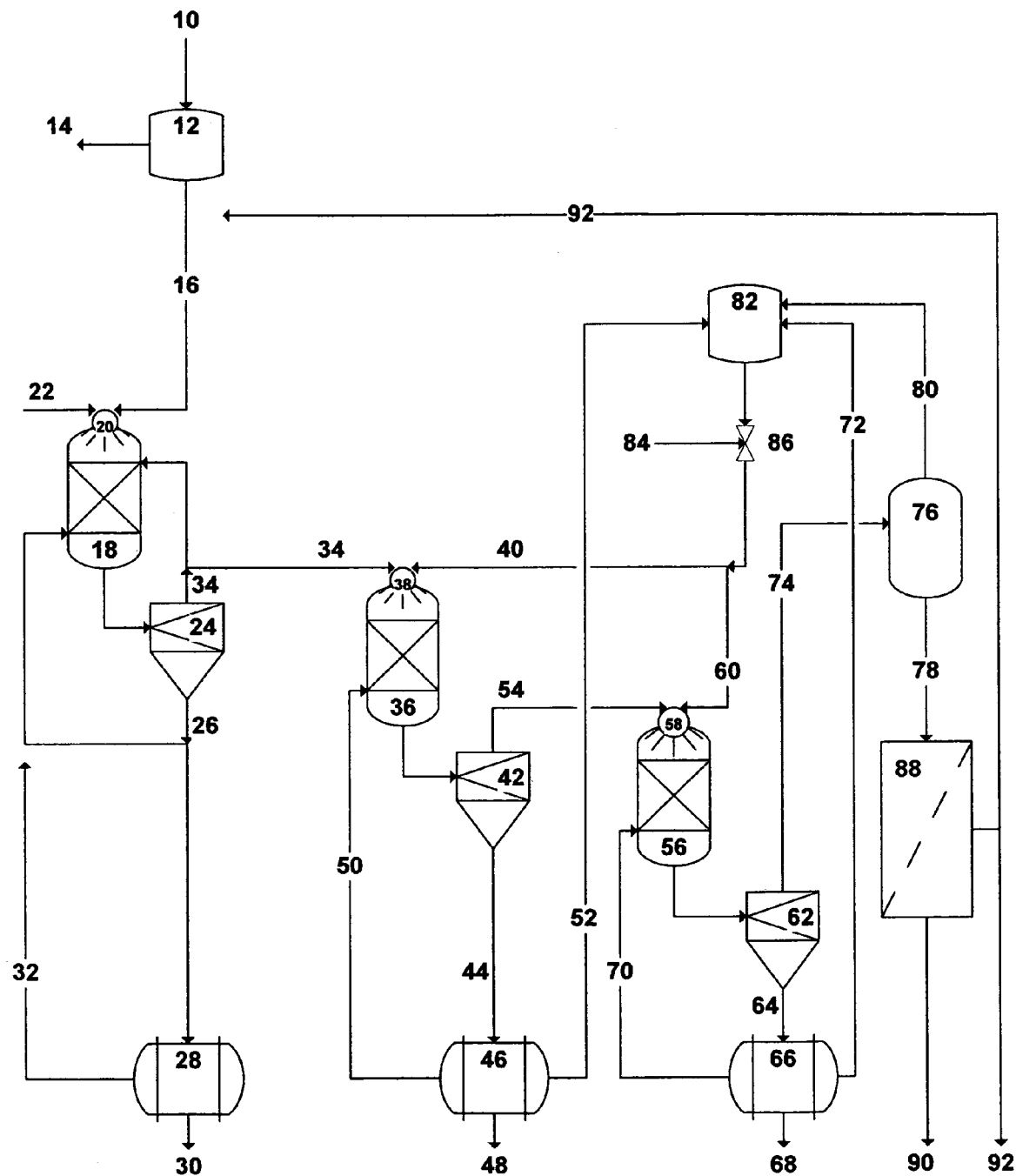
FIG. 10 illustrates a possible flow diagram for the invented method to de-oil, de-NORM, and partially de-salt and de-ionize produced water.

As shown in FIG. 10, oil-fields produced water [10] will be delivered to a stage of hydrophobic membranes [12] to recover oil droplets in a near pure form [14] from produced water [16]. The applied pressure ($p_a$) in this stage will be below the capillary pressure of water ($p_c$) so that hydrophobic membranes repel water and allow only the passage of oil droplets as a product stream.

The de-oiled produced water [16] will then be treated by the CPP process as a standalone (FIG. 6 or FIG. 7) or the integrated CPP-MD process (FIG. 9). The processing steps [16-86] in FIG. 10 are identical to the previously described processing steps [10-80] in FIG. 6 while the processing steps [88-92] in FIG. 10 are also identical to the previously described processing steps [82-86] in FIG. 9.

TABLE 1

Ions Concentrations in Samples of Produced Water and Sulfate-Rich Saline Streams.

| Ion | S1: mg/L (meq./L) | S2: mg/L (meq./L) | S3: mg/L (meq./L) | S4: mg/L (meq./L) | S5: mg/L (meq./L) |
|---|---|---|---|---|---|
| Cations | | | | | |
| $Na^+$ | 68,959 (2,998.2) | 12,170 (529.1) | 11,990 (521.3) | 20,090 (873.5) | 23,240 (1,010.4) |
| $K^+$ | 2,851 (72.9) | 420 (10.7) | 93 (2.4) | 1,024 (26.2) | 740 (18.9) |
| $Mg^{+2}$ | 3,198 (263.2) | 1,530 (125.9) | 190 (15.6) | 2,330 (191.7) | 2,890 (237.8) |
| $Ca^{+2}$ | 19,014 (950.7) | 540 (27) | 498 (24.9) | 837 (41.9) | 1,750 (87.5) |
| $Sr^{+2}$ | 535 (12.2) | 7 (0.2) | 28 (0.6) | 21 (0.5) | N.D. |
| $Ba^{+2}$ | 10 (0.2) | N.D. | N.D. | N.D. | N.D. |
| Anions | | | | | |
| $Cl^-$ | 150,948 (4,258.1) | 24,000 (677) | 17,970 (506.9) | 36,164 (1,020.1) | 40,650 (1,146.7) |
| $HCO_3^-$ | 256 (4.2) | 140 (2.3) | 20 (0.3) | 256 (4.2) | 160 (2.6) |

TABLE 1-continued

Ions Concentrations in Samples of Produced Water and Sulfate-Rich Saline Streams.

| Ion | S1: mg/L (meq./L) | S2: mg/L (meq./L) | S3: mg/L (meq./L) | S4: mg/L (meq./L) | S5: mg/L (meq./L) |
|---|---|---|---|---|---|
| $SO_4^{-2}$ | 108 (2.3) | 3,100 (64.6) | 3,045 (63.4) | 5,099 (106.2) | 5,430 (113.1) |

S1: Sample of Produced Water from a Hydrocarbons Production Facility;
S2: Seawater from the Arabian Gulf;
S3: Sulfate-Rich Natural Brine;
S4: RO Brine from Seawater Treatment (Arabian Gulf);
S5: MSF Brine Seawater Treatment (Arabian Gulf).

TABLE 2

Ions Material Balance between Produced Water (vol. %) and Sulfate-Rich Saline Water (vol. %) to Satisfy the Unbalanced Sulfate Portion of Strontium.

| Ion | S1 + S2 (80% + 20%) (meq./L) | S1 + S3 (80% + 20%) (meq./L) | S1 + S4 (90% + 10%) (meq./L) | S1 + S5 (90% + 10%) (meq./L) |
|---|---|---|---|---|
| Cations | | | | |
| $Na^+$ | 2,504.0 | 2,495.0 | 2,786.0 | 2,799.0 |
| $K^+$ | 61.0 | 59.0 | 68.0 | 68.0 |
| $Mg^{+2}$ | 236.0 | 214.0 | 256.0 | 261.0 |
| $Ca^{+2}$ | 766.0 | 766.0 | 860.0 | 864.0 |
| $Sr^{+2}$ | 9.8 | 9.9 | 11.0 | 11.0 |
| $Ba^{+2}$ | ≈0.2 | ≈0.2 | ≈0.2 | ≈0.2 |
| Anions | | | | |
| $Cl^-$ | 3,542.0 | 3508.0 | 3934.0 | 3,947.0 |
| $HCO_3^-$ | 3.8 | 3.4 | 4.2 | 4.0 |
| $SO_4^{-2}$ | 14.8 | 14.5 | 12.7 | 13.4 |

S1: Sample of Produced Water from a Hydrocarbons Production Facility;
S2: Seawater from the Arabian Gulf;
S3: Sulfate-Rich Natural Brine;
S4: RO Brine from Seawater Treatment (Arabian Gulf);
S5: MSF Brine Seawater Treatment (Arabian Gulf).

TABLE 3

Properties of the Selected Pure Fluids.

| Fluid | $T_b$ K | $T_c$ K | $p_c$ atm (psi) | $V_c$ mL/mol | ω | DP (debye) |
|---|---|---|---|---|---|---|
| $N_2$ | 77.4 | 126.2 | 33.4 (490.8) | 89.9 | 0.039 | 0.0 |
| $N_2O$ | 184.7 | 309.6 | 71.5 (1050.8) | 97.4 | 0.165 | 0.2 |
| $CO_2$ | | 304.1 | 72.8 (1069.9) | 93.9 | 0.239 | 0.0 |
| MA ($CH_5N$) | 266.8 | 430.0 | 74.3 (1091.9) | | 0.292 | 1.3 |
| DMA ($C_2H_7N$) | 280.0 | 437.7 | 53.1 (780.4) | | 0.302 | 1.0 |
| EA ($C_2H_7N$) | 289.7 | 456.4 | 55.7 (818.6) | 182.0 | 0.289 | 1.3 |
| EPA ($C_3H_9N$) | 305.6 | 471.8 | 44.8 (658.6) | 221.0 | 0.291 | 1.2 |
| PA ($C_3H_9N$) | 321.7 | 497.0 | 48.1 (706.9) | 233.0 | 0.303 | 1.3 |
| DEA ($C_4H_{11}N$) | 328.6 | 496.5 | 37.1 (545.2) | 301.0 | 0.291 | 1.1 |
| DTA ($C_6H_{15}N$) | 357.1 | 523.1 | 30.2 (443.8) | | 0.360 | 1.0 |
| DPA ($C_6H_{15}N$) | 382.5 | 555.8 | 29.9 (439.4) | | 0.471 | 1.0 |
| $H_2O$ | 373.2 | 647.3 | 218.3 (3208.1) | 57.1 | 0.344 | 1.8 |

$T_b$: Normal Boiling Point; $T_c$: Critical Temperature; $p_c$: Critical Pressure; $V_c$: Critical Volume; ω: Pitzer's Acentric Factor; DP: Dipole Moment

What is claimed is:

1. A method for separating alkaline earth cations, brucite and hydrophilite from produced water to produce partially de-salted produced water, said method comprising the steps of:
 (a) removing said alkaline earth cations from said produced water by
  (i) pressurizing said produced water into first precipitator at pressure between 50 psi and 1,200 psi through at least one nozzle to produce a jet stream of said produced water;
  (ii) pressurizing sulfate-rich saline water into said first precipitator at pressure between 50 psi and 1,200 psi through at least one nozzle to form first intermediate stream and precipitates comprising said alkaline earth cations by allowing the concentration of sulfate to exceed the concentration of strontium in said first intermediate stream;
  (iii) removing said precipitates from said first intermediate stream by first filter to produce alkaline earth cations slurry and second intermediate stream;
  (iv) separating said alkaline earth cations slurry into dewatered alkaline earth cations precipitates and first liquor stream by dewatering filter;
  (v) recycling said first liquor stream to said first precipitator;
 (b) removing said brucite from said second intermediate stream by
  (i) pressurizing said second intermediate stream into second precipitator at pressure between 50 psi and 1,200 psi through at least one nozzle to produce a jet stream of said second intermediate stream;
  (ii) pressurizing amine solvent or amine solvent with modifier into said second precipitator at pressure between 50 psi and the critical pressure of said amine solvent or said amine solvent with modifier through at least one nozzle to form precipitates comprising said brucite from said second intermediate stream;
  (iii) removing said precipitates from said second intermediate stream by second filter to produce brucite slurry and third intermediate stream;
  (iv) separating said brucite slurry into dewatered brucite precipitates and second liquor stream by vacuum filter;
  (v) recovering at least most of remaining said amine solvent or said amine solvent with modifier from said second liquor stream by said vacuum filter;
  (vi) recycling said second liquor stream to said second precipitator;
 (c) removing said hydrophilite from said third intermediate stream by
  (i) pressurizing said third intermediate stream into third precipitator at pressure between 50 psi and 1,200 psi through at least one nozzle to produce a jet stream of said third intermediate stream;
  (ii) pressurizing said amine solvent or said amine solvent with modifier into said third precipitator at pressure between 50 psi and the critical pressure of said amine solvent or said amine solvent with modifier through at least one nozzle to form precipitates comprising said hydrophilite from said third intermediate stream;
  (iii) removing said precipitates from said third intermediate stream by third filter to produce hydrophilite slurry and fourth intermediate stream;
  (iv) separating said hydrophilite slurry into dewatered hydrophilite precipitates and third liquor stream by another vacuum filter;

(v) recovering at least most of remaining said amine solvent or said amine solvent with modifier from said third liquor stream by said another vacuum filter;

(vi) recycling said third liquor stream to said third precipitator;

(vii) removing at least most of said amine solvent or said amine solvent with modifier from said fourth intermediate stream by stripping unit to produce said partially de-salted produced water;

(d) injecting said partially de-salted produced water into subterranean formation for hydrocarbons recovery; or (e) using said partially de-salted produced water for oil-fields fire extinguishing; or (f) using said partially de-salted produced water for dust control; or (g) producing de-ionized water from said partially de-salted produced water by membrane distillation.

2. The method of claim 1 wherein said alkaline earth cations are strontium, barium, radium, radon, polonium, bismuth, thallium, lead, or a combination thereof.

3. The method of claim 1 wherein said produced water is oil-fields produced water, methane-bed produced water, coal-bed produced water, formation water, or a combination thereof.

4. The method of claim 1 wherein said sulfate-rich saline water is seawater, brine streams from seawater desalination plants, sulfate-rich natural brine, agricultural drainage water, flue gas desulphurization water, or a combination thereof.

5. The method of claim 1 wherein said amine solvent is selected from the group consisting of isopropylamine, propylamine, dipropylamine, diisopropylamine, ethylamine, diethylamine, methylamine, dimethylamine, or a combination thereof.

6. A method for separating alkaline earth cations, brucite and hydrophilite from produced water to produce partially de-salted produced water, said method comprising the steps of:

(a) removing said alkaline earth cations from said produced water by (i) mixing sulfate-rich saline water with said produced water to produce first intermediate stream by allowing the concentration of sulfate to exceed the concentration of strontium in said first intermediate stream;

(ii) pressurizing said first intermediate stream into first precipitator at pressure between 50 psi and 1,200 psi through at least one nozzle to produce a jet stream of said first intermediate stream;

(iii) pressurizing amine solvent or amine solvent with modifier into said first precipitator at pressure between 50 psi and the critical pressure of said amine solvent or said amine solvent with modifier through at least one nozzle to form precipitates comprising said alkaline earth cations from said first intermediate stream;

(iv) removing said precipitates from said first intermediate stream by first filter to produce alkaline earth cations slurry and second intermediate stream;

(v) separating said alkaline earth cations slurry into dewatered alkaline earth cations precipitates and first liquor stream by first vacuum filter;

(vi) recovering at least most of remaining said amine solvent or said amine solvent with modifier from said first liquor stream by said first vacuum filter;

(vii) recycling said first liquor stream to said first precipitator;

(b) removing said brucite from said second intermediate stream by (i) pressurizing said second intermediate stream into second precipitator at pressure between 50 psi and 1,200 psi through at least one nozzle to produce a jet stream of said second intermediate stream;

(ii) pressurizing said amine solvent or said amine solvent with modifier into said second precipitator at pressure between 50 psi and the critical pressure of said amine solvent or said amine solvent with modifier through at least one nozzle to form precipitates comprising said brucite from said second intermediate stream;

(iii) removing said precipitates from said second intermediate stream by second filter to produce brucite slurry and third intermediate stream;

(iv) separating said brucite slurry into dewatered brucite precipitates and second liquor stream by second vacuum filter;

(v) recovering at least most of remaining said amine solvent or said amine solvent with modifier from said second liquor stream by said second vacuum filter;

(vi) recycling said second liquor stream to said second precipitator;

(c) removing said hydrophilite from said third intermediate stream by (i) pressurizing said third intermediate stream into third precipitator at pressure between 50 psi and 1,200 psi through at least one nozzle to produce a jet stream of said third intermediate stream;

(ii) pressurizing said amine solvent or said amine solvent with modifier into said third precipitator at pressure between 50 psi and the critical pressure of said amine solvent or said amine solvent with modifier through at least one nozzle to form precipitates comprising said hydrophilite from said third intermediate stream;

(iii) removing said precipitates from said third intermediate stream by third filter to produce hydrophilite slurry and fourth intermediate stream;

(iv) separating said hydrophilite slurry into dewatered hydrophilite precipitates and third liquor stream by third vacuum filter;

(v) recovering at least most of remaining said amine solvent or said amine solvent with modifier from said third liquor stream by said third vacuum filter;

(vi) recycling said third liquor stream to said third precipitator;

(vii) removing at least most of said amine solvent or said amine solvent with modifier from said fourth intermediate stream by stripping unit to produce said partially de-salted produced water;

(d) injecting said partially de-salted produced water into subterranean formation for hydrocarbons recovery; or (e) using said partially de-salted produced water for oil-fields fire extinguishing; or (f) using said partially de-salted produced water for dust control; or (g) producing de-ionized water from said partially de-salted produced water by membrane distillation.

7. The method of claim 6 wherein said alkaline earth cations are strontium, barium, radium, radon, polonium, bismuth, thallium, lead, or a combination thereof.

8. The method of claim 6 wherein said produced water is oil-fields produced water, methane-bed produced water, coal-bed produced water, formation water, or a combination thereof.

9. The method of claim 6 wherein said sulfate-rich saline water is seawater, brine streams from seawater desalination plants, sulfate-rich natural brine, agricultural drainage water, flue gas desulphurization water, or a combination thereof.

10. The method of claim 6 wherein said amine solvent is selected from the group consisting of isopropylamine, propylamine, dipropylamine, diisopropylamine, ethylamine, diethylamine, methylamine, dimethylamine, or a combination thereof.

11. A method for separating oil, alkaline earth cations, brucite and hydrophilite from produced water to produce de-oiled and partially de-salted produced water, said method comprising the steps of:
(a) separating said oil from said produced water by hydrophobic membranes to produce de-oiled produced water;
(b) removing said alkaline earth cations from said de-oiled produced water by
  (i) pressurizing said de-oiled produced water into first precipitator at pressure between 50 psi and 1,200 psi through at least one nozzle to produce a jet stream of said de-oiled produced water;
  (ii) pressurizing sulfate-rich saline water into said first precipitator at pressure between 50 psi and 1,200 psi through at least one nozzle to form first intermediate stream and precipitates comprising said alkaline earth cations by allowing the concentration of sulfate to exceed the concentration of strontium in said first intermediate stream;
  (iii) removing said precipitates from said first intermediate stream by first filter to produce alkaline earth cations slurry and second intermediate stream;
  (iv) separating said alkaline earth cations slurry into dewatered alkaline earth cations precipitates and first liquor stream by dewatering filter;
  (v) recycling said first liquor stream to said first precipitator;
(c) removing said brucite from said second intermediate stream by
  (i) pressurizing said second intermediate stream into second precipitator at pressure between 50 psi and 1,200 psi through at least one nozzle to produce a jet stream of said second intermediate stream;
  (ii) pressurizing amine solvent or amine solvent with modifier into said second precipitator at pressure between 50 psi and the critical pressure of said amine solvent or said amine solvent with modifier through at least one nozzle to form precipitates comprising said brucite from said second intermediate stream;
  (iii) removing said precipitates from said second intermediate stream by second filter to produce brucite slurry and third intermediate stream;
  (iv) separating said brucite slurry into dewatered brucite precipitates and second liquor stream by vacuum filter;
  (v) recovering at least most of remaining said amine solvent or said amine solvent with modifier from said second liquor stream by said vacuum filter;
  (vi) recycling said second liquor stream to said second precipitator;
(d) removing said hydrophilite from said third intermediate stream by
  (i) pressurizing said third intermediate stream into third precipitator at pressure between 50 psi and 1,200 psi through at least one nozzle to produce a jet stream of said third intermediate stream;
  (ii) pressurizing said amine solvent or said amine solvent with modifier into said third precipitator at pressure between 50 psi and the critical pressure of said amine solvent or said amine solvent with modifier through at least one nozzle to form precipitates comprising said hydrophilite from said third intermediate stream;
  (iii) removing said precipitates from said third intermediate stream by third filter to produce hydrophilite slurry and fourth intermediate stream;
  (iv) separating said hydrophilite slurry into dewatered hydrophilite precipitates and third liquor stream by another vacuum filter;
  (v) recovering at least most of remaining said amine solvent or said amine solvent with modifier from said third liquor stream by said another vacuum filter;
  (vi) recycling said third liquor stream to said third precipitator;
  (vii) removing at least most of said amine solvent or said amine solvent with modifier from said fourth intermediate stream by stripping unit to produce said de-oiled and partially de-salted produced water;
(e) injecting said de-oiled and partially de-salted produced water into subterranean formation for hydrocarbons recovery; or
(f) using said de-oiled and partially de-salted produced water for oil-fields fire extinguishing; or
(g) using said de-oiled and partially de-salted produced water for dust control; or
(h) producing de-ionized water from said de-oiled and partially de-salted produced water by membrane distillation.

12. The method of claim 11 wherein said alkaline earth cations are strontium, barium, radium, radon, polonium, bismuth, thallium, lead, or a combination thereof.

13. The method of claim 11 wherein said produced water is oil-fields produced water, methane-bed produced water, coal-bed produced water, formation water, or a combination thereof.

14. The method of claim 11 wherein said sulfate-rich saline water is seawater, brine streams from seawater desalination plants, sulfate-rich natural brine, agricultural drainage water, flue gas desulphurization water, or a combination thereof.

15. The method of claim 11 wherein said amine solvent is selected from the group consisting of isopropylamine, propylamine, dipropylamine, diisopropylamine, ethylamine, diethylamine, methylamine, dimethylamine, or a combination thereof.

16. A method for separating oil, alkaline earth cations, brucite and hydrophilite from produced water to produce de-oiled and partially de-salted produced water, said method comprising the steps of:
(a) separating said oil from said produced water by hydrophobic membranes to produce de-oiled produced water;
(b) removing said alkaline earth cations from said de-oiled produced water by
  (i) mixing sulfate-rich saline water with said de-oiled produced water to produce first intermediate stream by allowing the concentration of sulfate to exceed the concentration of strontium in said first intermediate stream;
  (ii) pressurizing said first intermediate stream into first precipitator at pressure between 50 psi and 1,200 psi through at least one nozzle to produce a jet stream of said first intermediate stream;
  (iii) pressurizing amine solvent or amine solvent with modifier into said first precipitator at pressure between 50 psi and the critical pressure of said amine solvent or said amine solvent with modifier through at least one nozzle to form precipitates comprising said alkaline earth cations from said first intermediate stream;

(iv) removing said precipitates from said first intermediate stream by first filter to produce alkaline earth cations slurry and second intermediate stream;
(v) separating said alkaline earth cations slurry into dewatered alkaline earth cations precipitates and first liquor stream by first vacuum filter;
(vi) recovering at least most of remaining said amine solvent or said amine solvent with modifier from said first liquor stream by said first vacuum filter;
(vii) recycling said first liquor stream to said first precipitator;
(c) removing said brucite from said second intermediate stream by
(i) pressurizing said second intermediate stream into second precipitator at pressure between 50 psi and 1,200 psi through at least one nozzle to produce a jet stream of said second intermediate stream;
(ii) pressurizing said amine solvent or said amine solvent with modifier into said second precipitator at pressure between 50 psi and the critical pressure of said amine solvent or said amine solvent with modifier through at least one nozzle to form precipitates comprising said brucite from said second intermediate stream;
(iii) removing said precipitates from said second intermediate stream by second filter to produce brucite slurry and third intermediate stream;
(iv) separating said brucite slurry into dewatered brucite precipitates and second liquor stream by second vacuum filter;
(v) recovering at least most of remaining said amine solvent or said amine solvent with modifier from said second liquor stream by said second vacuum filter;
(vi) recycling said second liquor stream to said second precipitator;
(d) removing said hydrophilite from said third intermediate stream by
(i) pressurizing said third intermediate stream into third precipitator at pressure between 50 psi and 1,200 psi through at least one nozzle to produce a jet stream of said third intermediate stream;
(ii) pressurizing said amine solvent or said amine solvent with modifier into said third precipitator at pressure between 50 psi and the critical pressure of said amine solvent or said amine solvent with modifier through at least one nozzle to form precipitates comprising said hydrophilite from said third intermediate stream;
(iii) removing said precipitates from said third intermediate stream by third filter to produce hydrophilite slurry and fourth intermediate stream;
(iv) separating said hydrophilite slurry into dewatered hydrophilite precipitates and third liquor stream by third vacuum filter;
(v) recovering at least most of remaining said amine solvent or said amine solvent with modifier from said third liquor stream by said third vacuum filter;
(vi) recycling said third liquor stream to said third precipitator;
(vii) removing at least most of said amine solvent or said amine solvent with modifier from said fourth intermediate stream by stripping unit to produce said de-oiled and partially de-salted produced water;
(e) injecting said de-oiled and partially de-salted produced water into subterranean formation for hydrocarbons recovery; or
(f) using said de-oiled and partially de-salted produced water for oil-fields fire extinguishing; or
(g) using said de-oiled and partially de-salted produced water for dust control; or
(h) producing de-ionized water from said de-oiled and partially de-salted produced water by membrane distillation.

17. The method of claim 16 wherein said alkaline earth cations are strontium, barium, radium, radon, polonium, bismuth, thallium, lead, or a combination thereof.

18. The method of claim 16 wherein said produced water is oil-fields produced water, methane-bed produced water, coal-bed produced water, formation water, or a combination thereof.

19. The method of claim 16 wherein said sulfate-rich saline water is seawater, brine streams from seawater desalination plants, sulfate-rich natural brine, agricultural drainage water, flue gas desulphurization water, or a combination thereof.

20. The method of claim 16 wherein said amine solvent is selected from the group consisting of isopropylamine, propylamine, dipropylamine, diisopropylamine, ethylamine, diethylamine, methylamine, dimethylamine, or a combination thereof.

* * * * *